United States Patent
Mishima

(10) Patent No.: US 8,126,012 B2
(45) Date of Patent: Feb. 28, 2012

(54) COMMUNICATION APPARATUS AND METHOD OF TRANSFERRING DATA

(75) Inventor: Kenichi Mishima, Inagi (JP)

(73) Assignee: Canon Kabushiki Kaisha, Tokyo (JP)

( * ) Notice: Subject to any disclaimer, the term of this patent is extended or adjusted under 35 U.S.C. 154(b) by 529 days.

(21) Appl. No.: 11/858,744

(22) Filed: Sep. 20, 2007

(65) Prior Publication Data
US 2008/0075004 A1    Mar. 27, 2008

(30) Foreign Application Priority Data
Sep. 22, 2006   (JP) .................. 2006-257889

(51) Int. Cl.
*H04J 3/24*   (2006.01)
(52) U.S. Cl. ................. 370/473; 370/394; 370/474
(58) Field of Classification Search ............ 370/394, 370/474, 395.64, 473
See application file for complete search history.

(56) References Cited

U.S. PATENT DOCUMENTS

| | | | |
|---|---|---|---|
| 6,445,742 B1 * | 9/2002 | Yoo et al. | 375/240.27 |
| 6,665,345 B1 * | 12/2003 | Sekiguchi et al. | 375/240.25 |
| 7,058,085 B2 * | 6/2006 | Earnshaw et al. | 370/473 |
| 2002/0159418 A1 | 10/2002 | Rudnick et al. | |
| 2005/0195858 A1 | 9/2005 | Nishibayashi et al. | |
| 2005/0232276 A1 * | 10/2005 | Glaser | 370/394 |
| 2006/0095944 A1 * | 5/2006 | Demircin et al. | 725/81 |
| 2007/0032198 A1 | 2/2007 | Sakamoto | |
| 2007/0110324 A1 * | 5/2007 | Kwon et al. | 382/233 |

FOREIGN PATENT DOCUMENTS

| | | |
|---|---|---|
| JP | 9-191314 A | 7/1997 |
| JP | 2002-314546 A | 10/2002 |
| JP | 2004-336730 A | 11/2004 |
| JP | 2005-252897 A | 9/2005 |
| JP | 2006-020130 A | 1/2006 |
| WO | 02089413 A1 | 11/2002 |

* cited by examiner

*Primary Examiner* — Derrick Ferris
*Assistant Examiner* — Matthew Hopkins
(74) *Attorney, Agent, or Firm* — Canon USA, Inc., I.P. Division

(57) ABSTRACT

A communication apparatus detects the start and end of a frame of a video, and notifies information indicating that the start of the frame of the video is detected and information indicating that the end of the frame of the video is detected to a communication unit that performs communication access control and that is included in the communication apparatus. The communication unit controls an acknowledgement in a media access control level, in transfer of the video, based on the notification.

6 Claims, 17 Drawing Sheets

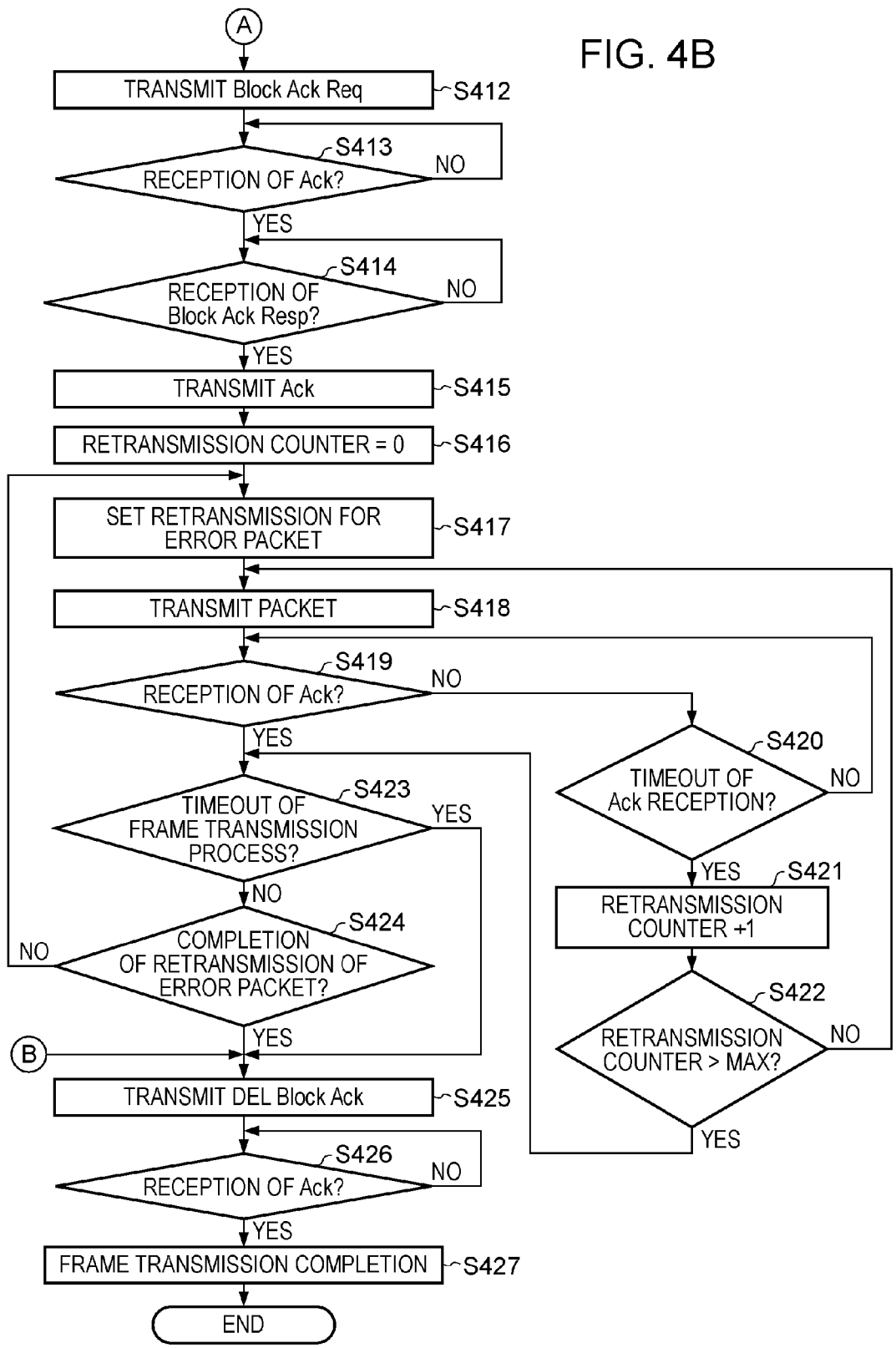

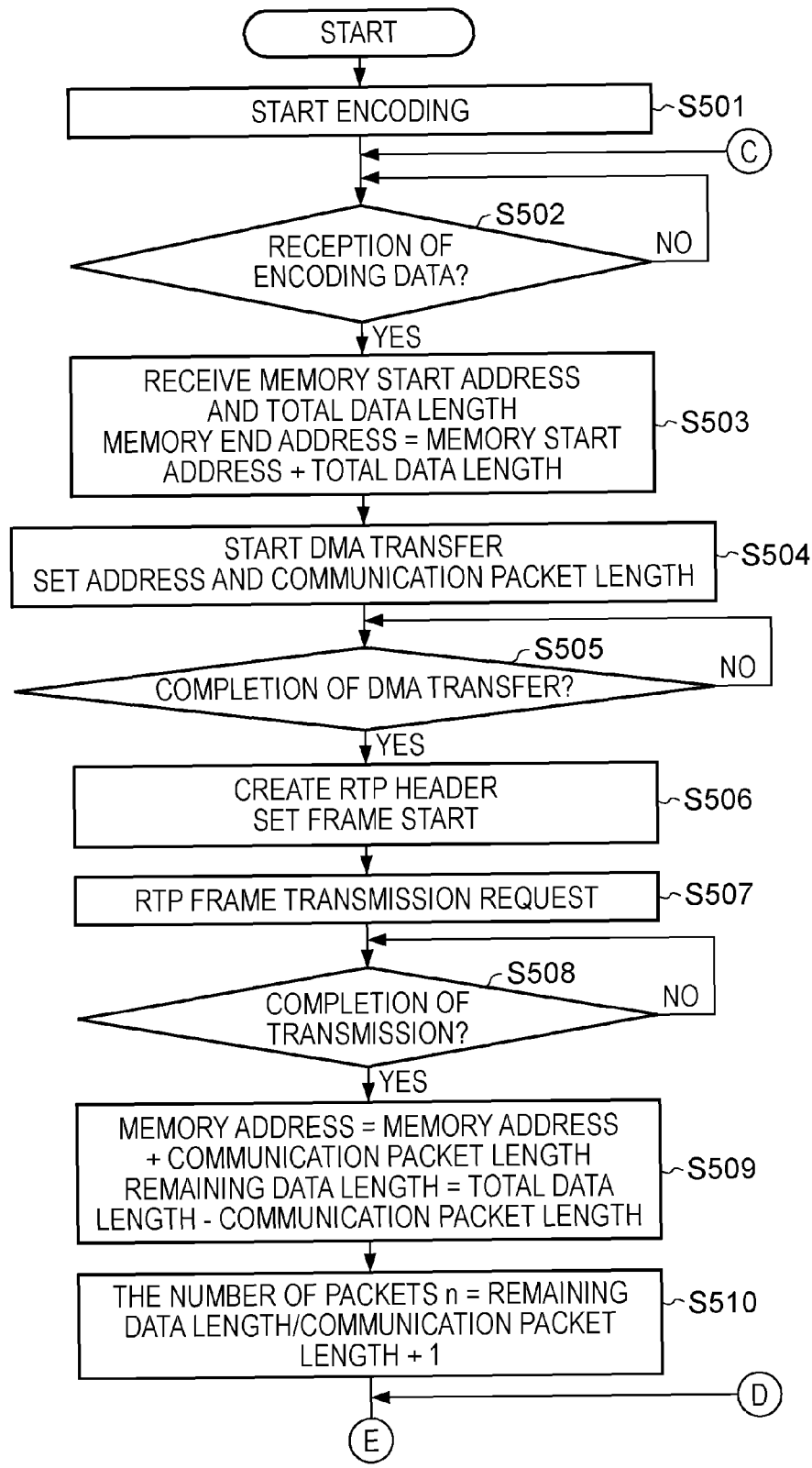

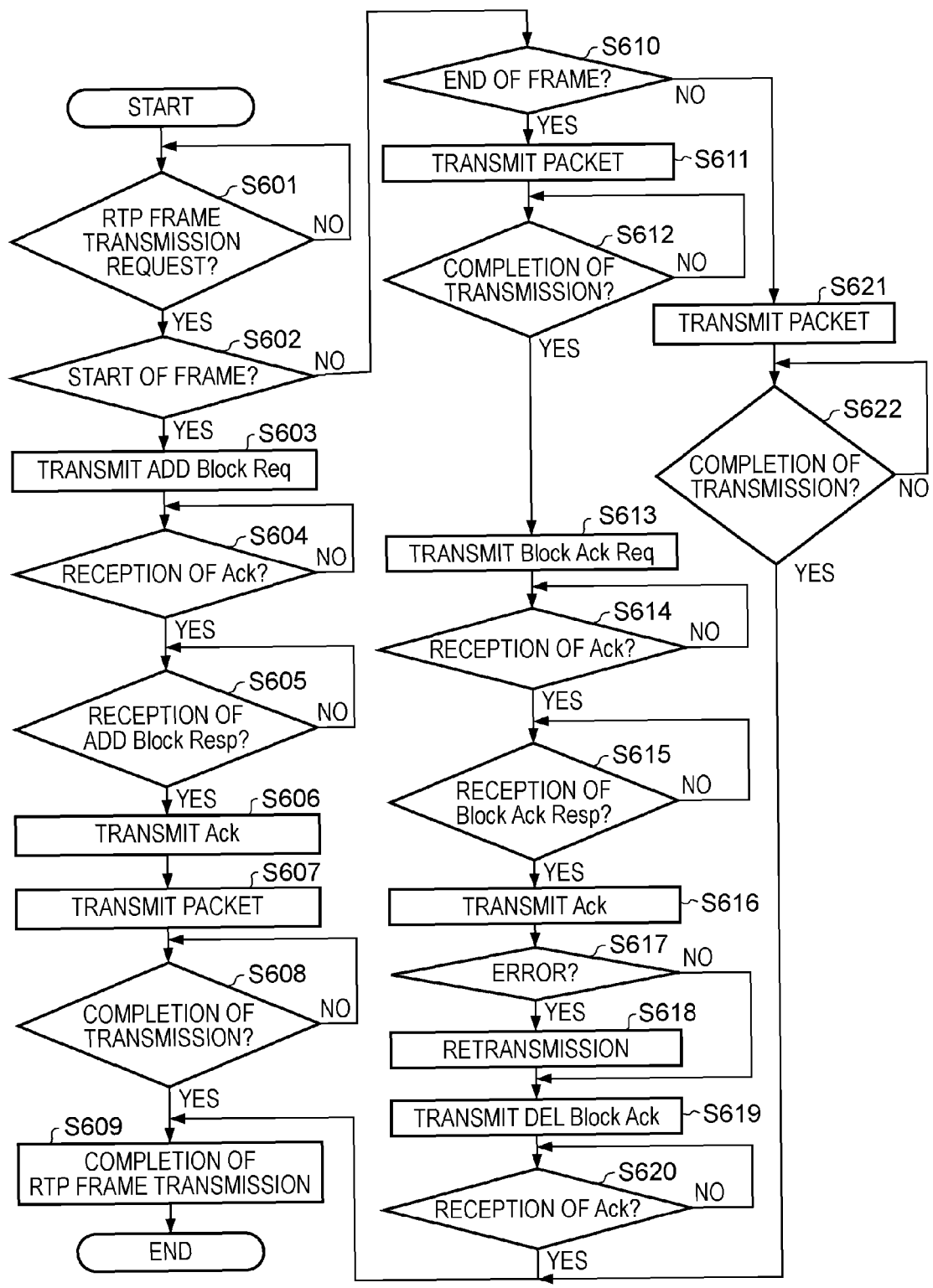

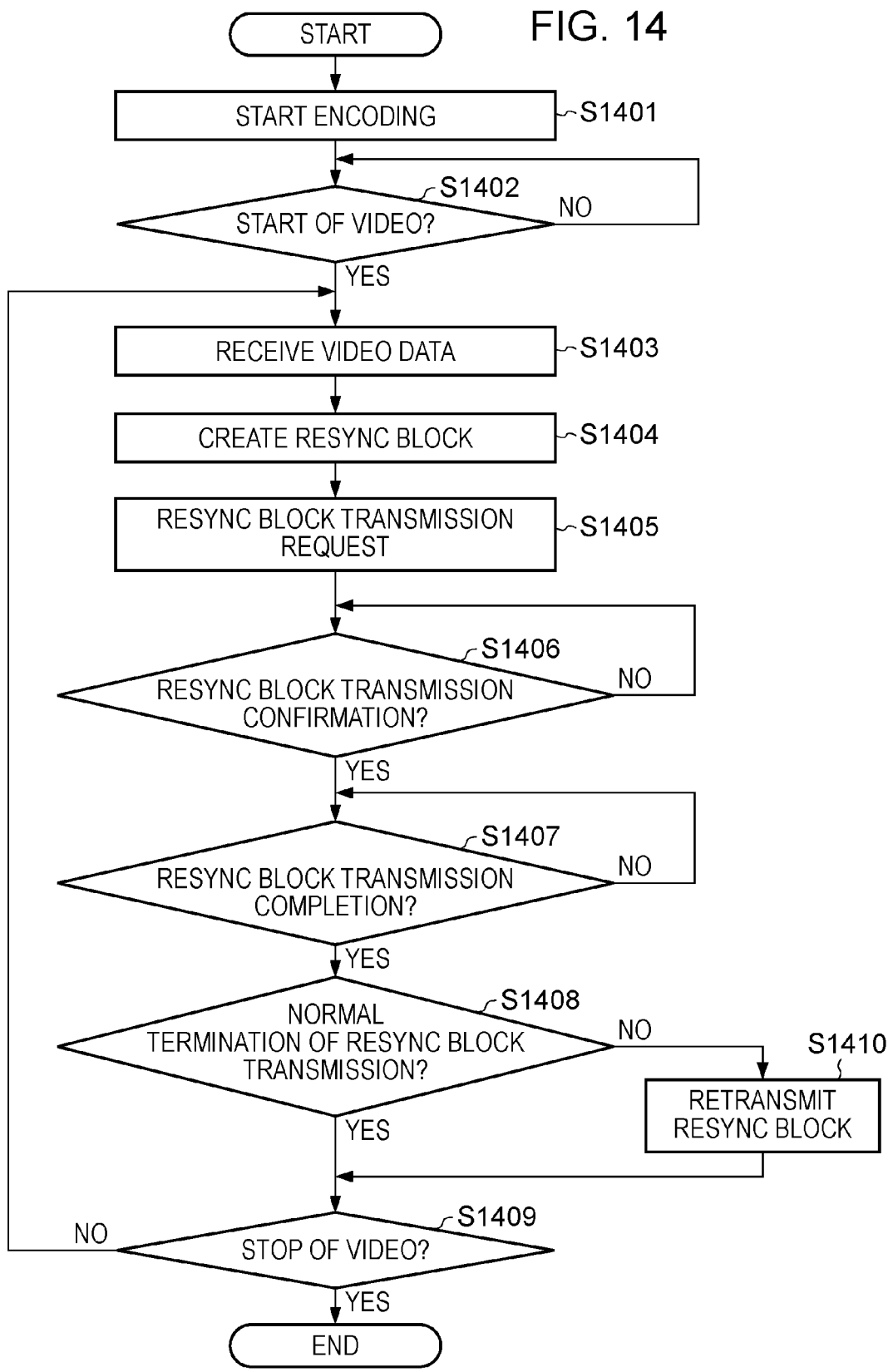

COMMUNICATION APPARATUS AND METHOD OF TRANSFERRING DATA

BACKGROUND OF THE INVENTION

1. Field of the Invention

The present invention relates to a communication apparatus and a method of transferring data.

2. Description of the Related Art

Specifications of access control for improvement of Quality of Service (QoS) are developed for wireless local area network (LAN) systems in the related art (for example, Institute of Electrical and Electronic Engineers (IEEE) 802.11e Standard Medium Access Control Quality of Service Enhancements).

US Patent Publication No. 2002/0159418 (Japanese Patent Laid-Open No. 2002-314546) discloses the QoS in the IEEE 802.11e Standard. US Patent Publication No. 2005/0195858 (Japanese Patent Laid-Open No. 2005-252897) and US Patent Publication No. 2007/0032198 (Japanese Patent Laid-Open No. 2004-336730) propose methods of transmitting Media Access Control (MAC) frames in order to improve the throughput.

Block Ack scheme is defined in the IEEE 802.11e Standard. In a MAC frame transfer method in the related art, a receiver device transmits an acknowledgement (Ack) if the receiver device normally receives a MAC frame. The receiver device transmits a negative acknowledgement (Nack) if the received MAC frame is not normal because of any error or if no MAC frame is received within a predetermined time.

A transmitter device moves to a transmission process of the next MAC frame if the transmitter device receives an Ack and performs a retransmission process if the transmitter device receives a Nack. If the transmitter device does not succeed in the transmission even after the retransmission process has been performed a predetermined number of times, the transmitter device gives up the retransmission. The transmitter device then indicates to an upper layer that the transmission abnormally terminates and performs the retransmission process at the upper layer. There are cases in which the receiver device does not return a Nack or in which the transmitter device cannot receive a Nack for any reason. In such cases, the transmitter device performs the retransmission process if the transmitter device receives no Ack within a predetermined time.

If a MAC frame is damaged or any error, such as transmission delay, occurs on the transmission path when media data, such as a motion picture, is transmitted in a system performing the MAC frame transfer method, the retransmission process is performed in a MAC level. However, the receiver device cannot display data concerning the motion picture that is received unless it receives the data within a predetermined time. Accordingly, there are cases in which the receiver device cannot use the data even if the retransmission process is performed, thus offering the inefficient retransmission method.

SUMMARY OF THE INVENTION

It is desirable to improve the efficiency of retransmission.

According to an aspect of the present invention, a communication apparatus includes a communication device configured to perform communication access control, and a notifying device configured to detect the start and end of a frame of a video and to notify information indicating that the start of the frame of the video is detected and information indicating that the end of the frame of the video is detected to the communication device. The communication device controls an acknowledgement in a media access control level, in transfer of the video, based on the notification by the notifying device.

According to another aspect of the present invention, a communication apparatus includes a determination device configured to determine a transmission rate of a video, and a retransmission device configured to perform retransmission of the video if the determination device determines that the transmission rate of the video is not higher than the predetermined transmission rate.

According to yet another aspect of the present invention, a communication apparatus includes a communication device configured to perform communication access control, and a notifying device configured to detect the start and end of a macro block of a video and to notify information indicating that the start of the macro block of the video is detected and information indicating that the end of the macro block of the video is detected to the communication device. The communication device controls an acknowledgement in a media access control level, in transfer of the video, based on the notification by the notifying device.

According to still yet another aspect of the present invention, a communication apparatus includes a communication device configured to perform communication access control, and a notifying device configured to detect the position of a resynchronization marker of a video and to notify information indicating that the position of the resynchronization marker of the video is detected to the communication device. The communication device controls an acknowledgement in a media access control level, in transfer of the video, based on the notification by the notifying device.

Further features and aspects of the present invention will become apparent from the following description of exemplary embodiments with reference to the attached drawings.

BRIEF DESCRIPTION OF THE DRAWINGS

FIGS. 4A and 4B are flowcharts illustrating an example of a frame transmission process performed by a communication module according to the first embodiment of the present invention.

FIGS. 5A and 5B are flowcharts illustrating an example of a stream transmission process performed by the communication control CPU according to a second embodiment of the present invention.

FIG. 6 is a flowchart illustrating an example of an RTP frame transmission process performed by the communication module according to the second embodiment of the present invention.

FIG. 14 is a flowchart illustrating an example of a stream transmission process performed by the communication control CPU according to the fifth embodiment of the present invention.

DESCRIPTION OF THE EMBODIMENTS

Exemplary embodiments of the present invention will herein be described with reference to the attached drawings.

Figure 1:
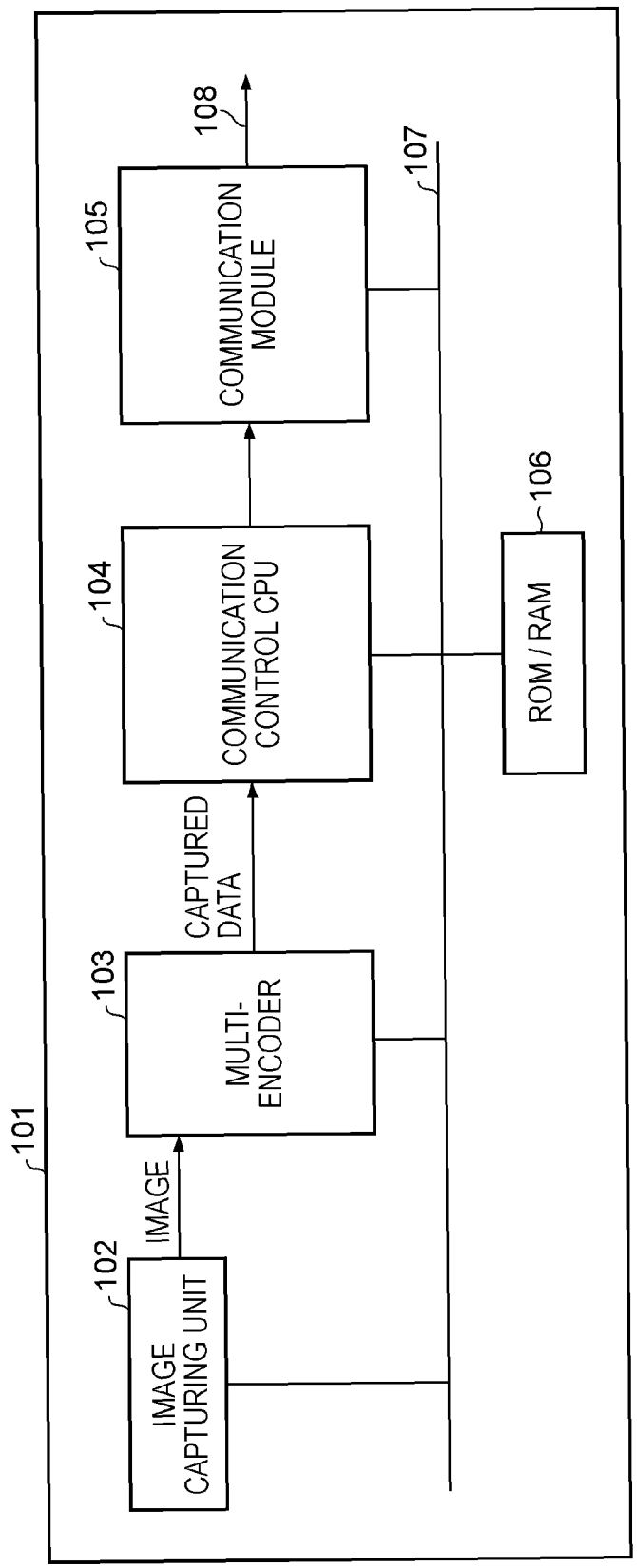
FIG. 1 is a block diagram illustrating an example of the configuration of a communication apparatus according to a first embodiment of the present invention.

FIG. 1 is a block diagram illustrating an example of the configuration of a communication apparatus 101 according to a first embodiment of the present invention. The communication apparatus 101 includes an image capturing unit 102, a multi-encoder 103, a communication control central processing unit (CPU) 104, a communication module 105, a read only memory (ROM)-random access memory (RAM) 106, and a system bus 107.

The image capturing unit 102 outputs an image that is captured by and supplied from a sensor. The multi-encoder 103 compresses the image supplied from the image capturing unit 102 in, for example, a Joint Photographic Experts Group (JPEG) or Moving Picture Experts Group (MPEG4) format and is capable of concurrently performing multiple processes. The communication control CPU 104 is, for example, a microprocessor mounted in the communication apparatus 101. The communication control CPU 104 controls the entire communication apparatus 101 and performs communication control. The communication control CPU 104 performs the processing in accordance with control programs stored in the ROM/RAM 106 described below.

The communication module 105 is a communication module for, for example, a wireless LAN, a wired LAN, or a public line. The communication module 105 performs connection to a receiver terminal, negotiation therewith, and transmission of data thereto. The ROM/RAM 106 stores the control programs and so on. The ROM/RAM 106 is also used as a working area of the communication control CPU 104, which temporarily stores a variety of control data.

The above components in the communication apparatus 101 are connected to each other via the system bus 107 in order to, for example, transfer data. A communication link 108 is, for example, a wireless LAN, a wired LAN, or a public line.

Figure 2:
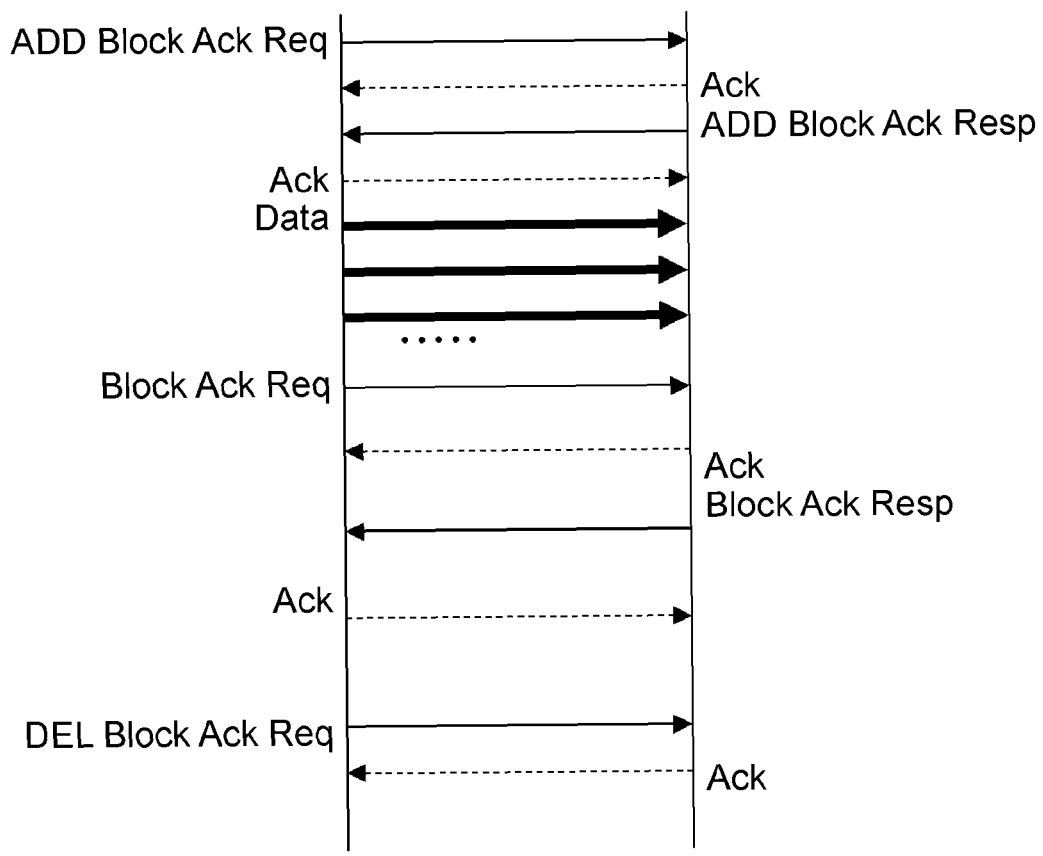
FIG. 2 illustrates an example of a sequence in a Block Ack scheme.

FIG. 2 illustrates an example of a sequence in a Block Ack scheme. As illustrated in FIG. 2, after a transmitter device transmits an ADD Block Ack Req and a receiver device returns an ADD Block Ack Resp, the transmitter device does not return any Ack involved in transmission of MAC frames. The receiver device transmits a Block Ack Resp as an integration of acknowledgements (Acks) for the received MAC frames in response to a Block Ack Req from the transmitter device. The control of the Block Ack scheme is terminated when the transmitter device transmits a DEL Block Ack Req.

Figure 3:
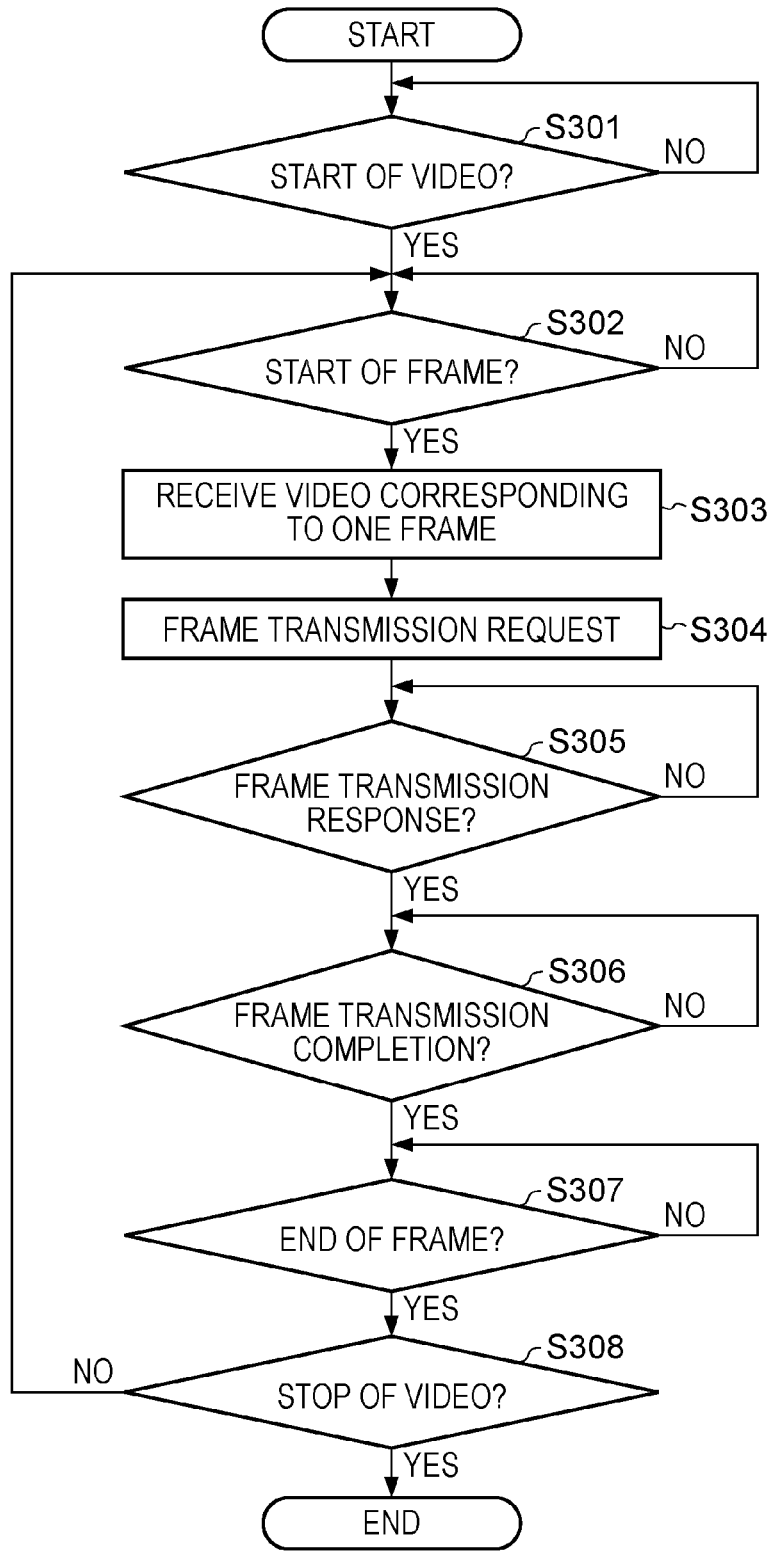
FIG. 3 is a flowchart illustrating an example of a stream transmission process performed by a communication control CPU according to the first embodiment of the present invention.

FIG. 3 is a flowchart illustrating an example of a stream transmission process performed by the communication control CPU 104 according to the present embodiment.

In Step S301, the communication control CPU 104 waits for the start of a video supplied from the multi-encoder 103. After the video is started and the communication control CPU 104 detects that the streaming from the multi-encoder 103 is enabled, the flow proceeds to Step S302 to wait for indication that the video frame is started. After the multi-encoder 103 indicates that the video frame is started, in Step S303, the communication control CPU 104 receives video data corresponding to one frame from the multi-encoder 103 and stores the received video data in a RAM in the ROM-RAM 106.

In Step S304, the communication control CPU 104 transmits a frame transmission request to the communication module 105. In Step S305, the communication control CPU 104 waits for a frame transmission response from the communication module 105. The flow proceeds to Step S306 if the communication control CPU 104 receives the frame transmission response. In Step S306, the communication control CPU 104 waits for reception of a frame transmission completion indicating that the video data corresponding to one frame has been transmitted from the communication module 105.

After the frame transmission completion is received, in Step S307, the communication control CPU 104 determines whether the multi-encoder 103 has detected the end of the frame. If the communication control CPU 104 determines that the multi-encoder 103 has detected the end of the frame, then in Step S308, the communication control CPU 104 determines whether the transfer of the video from the multi-encoder 103 is stopped. If the streaming is continued, the flow returns to Step S302 to process the next frame. If the communication control CPU 104 determines that the transfer of the video from the multi-encoder 103 is stopped, the process terminates.

Figure 4A:
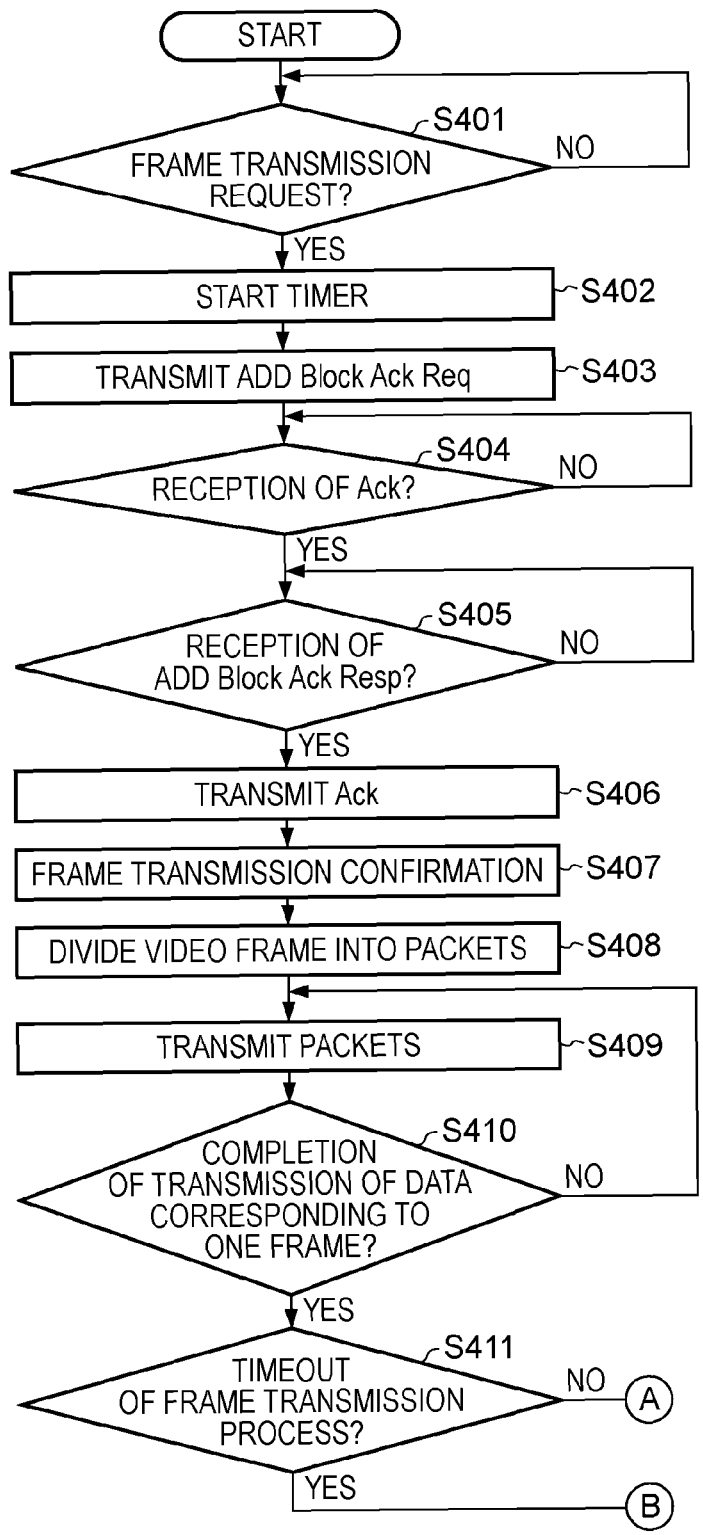

FIGS. 4A and 4B are flowcharts illustrating an example of a frame transmission process performed by the communication module 105 according to the present embodiment.

In Step S401, the communication module 105 waits for a frame transmission request from the communication control CPU 104. After the frame transmission request is received, in Step S402, the communication module 105 starts a timer in which a timeout time of transmission of one frame is set. For example, if it takes $\frac{1}{30}$ seconds or more to transmit one frame when 30 video frames are displayed per second, it is necessary to move to display of the next frame and, therefore, the transmission of the frame is wasted. Accordingly, the communication module 105 sets a timeout time of the frame transmission process in order to avoid dead transmission.

In Step S403, the communication module 105 transmits an ADD Block Ack Req to the terminal of a communication partner through the communication link 108 in order to start a Block Ack scheme. In Step S404, the communication module 105 waits for reception of an Ack indicating that the packet corresponding to the ADD Block Ack Req has been received by the terminal of the communication partner. After the Ack is received, in Step S405, the communication module 105 waits for the terminal of the communication partner to recognize the ADD Block Ack Req and for reception of an ADD Block Ack Resp indicating that the Block Ack scheme is acknowledged by the terminal of the communication partner. After the packet corresponding to the ADD Block Ack Resp is received through the communication link 108, in Step S406, the communication module 105 transmits an Ack indicating that the packet corresponding to the ADD Block Ack Resp has been received.

In Step S407, the communication module 105 transmits a frame transmission confirmation indicating that it is ready for the frame transmission process in the Block Ack scheme to the communication control CPU 104.

Since the video data corresponding to one frame is stored in the RAM in the ROM/RAM 106 by the communication control CPU 104, in Step S408, the communication module 105 divides the video frame into packets each having a length corresponding to the communication protocol. In Step S409, the communication module 105 transmits the packets of the video data through the communication link 108. In normal communication, after transmitting the packets, the communication module 105 waits for reception of an Ack from the terminal of the communication partner.

However, since the Block Ack scheme is set in the frame transmission process according to the present embodiment, the communication module 105 does not wait for reception of the Ack and the flow proceeds to Step S410. In Step S410, the communication module 105 determines whether the data corresponding to one frame in the ROM-RAM 106 has been transmitted. If the communication module 105 determines that the data corresponding to one frame in the ROM-RAM 106 has not been transmitted, the flow returns to Step S409, where the next packet is transmitted. If the communication module 105 determines that the data corresponding to one frame in the ROM-RAM 106 has been transmitted, then in Step S411, the communication module 105 determines whether timeout of the frame transmission process occurs.

If the communication module 105 determines that the timeout of the frame transmission process occurs, then in Step S425, the communication module 105 transmits a DEL Block Ack for terminating the Block Ack scheme because the data is wasted even if the transmission is performed. In Step S426, the communication module 105 waits for reception of an Ack. In Step S427, the communication module 105 transmits a frame transmission completion indicating that the frame transmission process is terminated to the communication control CPU 104 to terminate the frame transmission process and waits for the next frame transmission request.

If the communication module 105 determines in Step S411 that the timeout of the frame transmission process does not occur, the flow proceeds to Step S412 because the transmission of the packet corresponding to one frame is completed. In Step S412, the communication module 105 transmits a Block Ack Req to the terminal of the communication partner through the communication link 108. The Block Ack Req is used for requesting integration of the Acks to determine whether the transmitted packets have been normally received. In Step S413, the communication module 105 waits for reception of an Ack indicating that the Block Ack Req is normally received. In Step S414, the communication module 105 waits for reception of a Block Ack Resp collectively indicating the pieces of Ack information transmitted from the terminal of the communication partner. After the Block Ack Resp is received, in Step S415, the communication module 105 transmits an Ack indicating that the Block Ack Resp has been received to the terminal of the communication partner.

In Step S416, the communication module 105 initializes a retransmission counter to zero in order to prepare the retransmission.

In Step S417, the communication module 105 checks the Ack information in the Block Ack Resp and sets the retransmission for the first error packet. In Step S418, the communication module 105 transmits the packet for which the retransmission is set. In Step S419, the communication module 105 waits for reception of an Ack indicating that the packet for which the retransmission is set has been received. If the communication module 105 does not receive the Ack, then in Step S420, the communication module 105 determines whether timeout of the Ack reception occurs. If the communication module 105 determines that the timeout of the Ack reception occurs, then in Step S421, the communication module 105 increments the retransmission counter by one. In Step S422, the communication module 105 determines whether the retransmission counter exceed a predetermined number of times of the retransmission.

If the communication module 105 determines in Step S420 that the timeout of the Ack reception does not occur, the flow returns to Step S419, where the communication module 105 waits for reception of the Ack. If the communication module 105 determines in Step S422 that the retransmission counter does not exceed MAX (the predetermined number of times of the retransmission), the flow returns to Step S418, where the error packet is re-transmitted. If the communication module 105 determines in Step S422 that the retransmission counter exceeds the MAX (the predetermined number of times of the retransmission), the flow proceeds to Step S423.

If the communication module 105 receives the Ack in Step S419, the flow proceeds to Step S423. In Step S423, the communication module 105 determines whether timeout of the frame transmission process occurs due to the retransmission. If the communication module 105 determines that the timeout of the frame transmission process occurs, then in Step S425, the communication module 105 transmits a DEL Block Ack for terminating the Block Ack scheme. In Step S426, the communication module 105 waits for reception of an Ack. In Step S427, the communication module 105 transmits the frame transmission completion to the communication control CPU 104 to move to the transmission of the next frame.

If the communication module 105 determines in Step S423 that the timeout of the frame transmission process does not occur, then in Step S424, the communication module 105 determines whether the retransmission of all the error packets indicated in the Block Ack Resp has been completed. If the communication module 105 determines that the retransmission of all the error packets indicated in the Block Ack Resp has been completed, then in Step S425, the communication module 105 transmits a DEL Block Ack for terminating the Block Ack scheme. In Step S426, the communication module 105 waits for reception of an Ack. In Step S427, the communication module 105 transmits the frame transmission completion indicating that the frame transmission process is terminated to the communication control CPU 104 to move to the transmission of the next frame.

If the communication module 105 determines in Step S424 that the retransmission of all the error packets indicated in the Block Ack Resp has not been completed, then the flow returns to Step S417, where the next error packet is transmitted.

As described above, according to the present embodiment, since the transmission is performed in the Block Ack scheme while the packets resulting from the division of the frame are transmitted, it is not necessary to receive the Ack each time the packet is transmitted, thus improving the transfer efficiency. In addition, it is possible to suppress the retransmission after the timeout time during which the transmission of the frame must be completed elapsed, thus further improving the transfer efficiency.

Figure 5B:
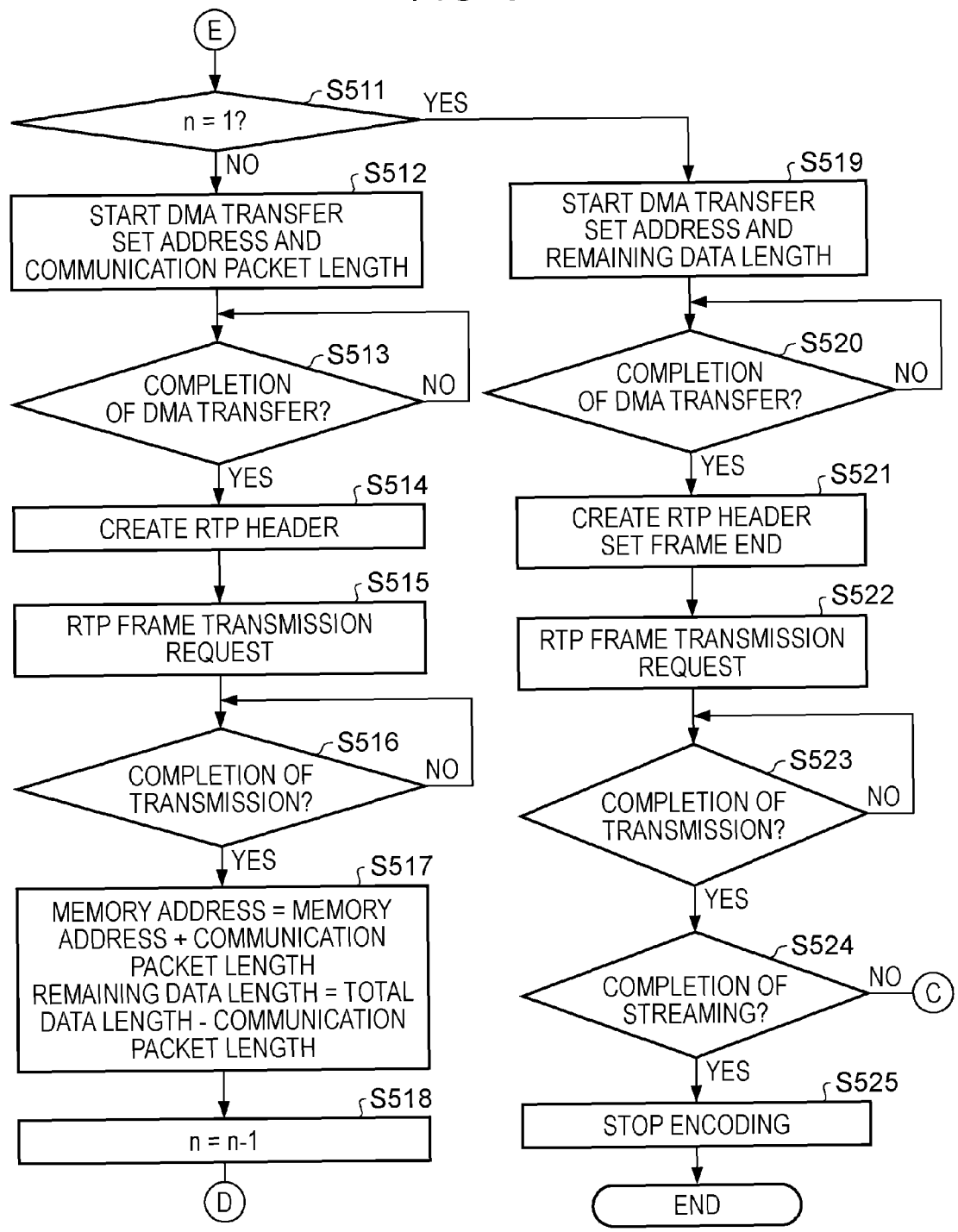

FIGS. 5A and 5B are flowcharts illustrating an example of a stream transmission process performed by the communication control CPU 104 according to a second embodiment of the present invention.

In Step S501, the communication control CPU 104 instructs the multi-encoder 103 to start an encoding process of a stream. In Step S502, the communication control CPU 104 waits for completion of reception of encoding data from the multi-encoder 103 in the RAM in the ROM/RAM 106.

After reception of the encoding data is completed, in Step S503, the communication control CPU 104 checks the memory start address in the RAM in the ROM/RAM 106 to which the multi-encoder 103 transmits the encoding data and the total length of the transmitted data. The communication control CPU 104 calculates the memory end address, i.e., the address given by adding the total data length to the memory start address.

In Step S504, the communication control CPU 104 starts direct memory access (DMA) transfer to transmit the encoding data from the RAM in the ROM/RAM 106 to another RAM in order to pass the encoding data to the communication module 105. The communication control CPU 104 sets the memory start address and a communication packet length that is set in advance and starts (invokes) the DMA transfer to pass the data having the set communication packet length to the communication module 105 by the DMA transfer.

In Step S505, the communication control CPU 104 waits for completion of the DMA transfer in the ROM/RAM 106. After the DMA transfer is completed, in Step S506, the communication control CPU 104 creates a Real-time Transport Protocol (RTP) header of the communication packet, sets the frame start bit in an optional area to one, and writes the RTP header and the frame start bit in the ROM-RAM 106. In Step S507, the communication control CPU 104 transmits an RTP frame transmission request to the communication module 105. In Step S508, the communication control CPU 104 waits for indication of the completion of the transmission from the communication module 105.

After the transmission is completed, in Step S509, the communication control CPU 104 calculates the memory address indicating the beginning of the next encoding data to be transmitted by adding the communication packet length to the memory address stored in the ROM-RAM 106. The communication control CPU 104 calculates the remaining data length by subtracting the communication packet length from the total data length.

In Step S510, the communication control CPU 104 calculates the number of packets included in the encoding data stored in the ROM-RAM 106. Specifically, the communication control CPU 104 adds one to the result of division of the remaining data length by the communication packet length and stores the addition result as the number of packets n. In Step S511, the communication control CPU 104 determines whether the number of packets n is equal to one, i.e., whether the packet is the last packet. If the communication control CPU 104 determines that the number of packets n is not equal to one, the flow proceeds to Step S512.

In Step S512, the communication control CPU 104 sets the address and the communication packet length for the next packet transmission and starts the DMA transfer of the data in the ROM-RAM 106.

In Step S513, the communication control CPU 104 waits for completion of the DMA transfer. After the DMA transfer is completed, in Step S514, the communication control CPU 104 creates a RTP header of the communication packet, sets the frame end bit to zero, and writes the RTP header and the frame end bit in the ROM-RAM 106. In Step S515, the communication control CPU 104 transmits an RTP frame transmission request to the communication module 105. In Step S516, the communication control CPU 104 waits for indication of the completion of the transmission from the communication module 105.

After the transmission is completed, in Step S517, the communication control CPU 104 increases the memory address by an amount corresponding to the communication packet length and subtracts the communication packet length from the total data length to calculate the remaining data length in order to prepare the next packet transmission. In Step S518, the communication control CPU 104 subtracts one from the number of packets n and, then, the flow returns to Step S511, where the next packet is transmitted.

If the communication control CPU 104 determines in Step S511 that the number of packets n is equal to one, i.e., the packet is the last packet, then in Step S519, the communication control CPU 104 sets the address and the remaining data length and starts the DMA transfer. In Step S520, the communication control CPU 104 waits for completion of the DMA transfer. In Step S521, the communication control CPU 104 creates a RTP header of the communication packet, sets the frame end bit in the optional area to one, and writes the RTP header and the frame end bit in the ROM/RAM 106.

In Step S522, the communication control CPU 104 transmits an RTP frame transmission request to the communication module 105. In Step S523, the communication control CPU 104 waits for completion of the transmission of the RTP frame. After the transmission is completed, in Step S524, the communication control CPU 104 determines whether the streaming is completed. If the communication control CPU 104 determines that the streaming is not completed, the flow returns to Step S502, where the communication control CPU 104 waits for reception of the next encoding data. If the communication control CPU 104 determines that the streaming is completed, then in Step S525, the communication control CPU 104 instructs the multi-encoder 103 to stop the encoding. The process then terminates.

FIG. 6 is a flowchart illustrating an example of an RTP frame transmission process performed by the communication module 105 according to the present embodiment.

In Step S601, the communication module 105 waits for reception of an RTP frame transmission request from the communication control CPU 104. After the RTP frame transmission request is received, in Step S602, the communication module 105 determines whether the frame start bit in the RTP header written in the ROM/RAM 106 by the communication control CPU 104 is set to one. If the communication module 105 determines that the frame start bit in the RTP header is set to one, then in Step S603, the communication module 105 transmits an ADD Block Req indicating start of the Block Ack scheme to the terminal of the communication partner through the communication link 108.

In Step S604, the communication module 105 waits for reception of an Ack indicating that the ADD Block Req has been received through the communication link 108. After the Ack is received, in Step S605, the communication module 105 waits for reception of an ADD Block Resp indicating that the terminal of the communication partner acknowledges the Block Ack scheme. After the ADD Block Resp is received, in Step S606, the communication module 105 transmits an Ack indicating that the ADD Block Resp has been received to the terminal of the communication partner through the communication link 108.

In Step S607, the communication module 105 transmits a packet in which the RTP header written in the ROM/RAM 106 is added to the data received by the DMA transfer to the terminal of the communication partner through the communication link 108 as a packet including the actual data. In Step S608, the communication module 105 waits for completion of the transmission of the packet. After the transmission of the packet is completed, in Step S609, the communication module 105 indicates the completion of the RTP frame transmission to the communication control CPU 104 and the process terminates.

If the communication module 105 determines in Step S602 that the frame start bit in the RTP header is not set to one, then in Step S610, the communication module 105 determines whether the frame end bit in the RTP header is set to one. If the communication module 105 determines that the frame end bit in the RTP header is set to one, then in Step S611, the communication module 105 transmits a packet in which the RTP header written in the ROM-RAM 106 is added to the data received by the DMA transfer to the terminal of the communication partner through the communication link 108.

In Step S612, the communication module 105 waits for completion of the transmission of the packet. After the transmission of the packet is completed, in Step S613, the communication module 105 transmits a Block Ack Req to the terminal of the communication partner through the communication link 108 to instruct the terminal of the communication partner to collectively transmit the results of the Acks for the transmitted packets. In Step S614, the communication module 105 waits for reception of an Ack indicating that the Block Ack Req has been received by the terminal of the communication partner.

After the Ack is received, in Step S615, the communication module 105 waits for reception of a Block Ack Resp indicating how much data is included in the packet received by the terminal of the communication partner. After the Block Ack Resp is received from the terminal of the communication partner through the communication link 108, then in Step S616, the communication module 105 transmits an Ack indicating that the Block Ack Resp has been received to the terminal of the communication partner through the communication link 108.

In Step S617, the communication module 105 determines whether any error is reported in the Block Ack Resp received from the terminal of the communication partner. If the communication module 105 determines that an error is reported in the Block Ack Resp, then in Step S618, the communication module 105 retransmits the packet of which the error has been reported. If the communication module 105 determines that no error is reported in the Block Ack Resp, the communication module 105 does not perform the retransmission and the flow proceeds to Step S619.

In Step S619, the communication module 105 transmits a DEL Block Ack instructing termination of the Block Ack scheme to the terminal of the communication partner through the communication link 108. In Step S620, the communication module 105 waits for reception of an Ack indicating that the terminal of the communication partner has received the DEL block Ack. After the Ack is received, the flow proceeds to Step S609. In Step S609, the communication module 105 indicates the completion of the RTP frame transmission to the communication control CPU 104, and then the process terminates.

If the communication module 105 determines in Step S610 that the frame end bit in the RTP header is not set to one (is set to zero), then in Step S621, the communication module 105 transmits a packet including normal data to the terminal of the communication partner through the communication link 108. Specifically, the communication module 105 transmits the packet in which the RTP header written in the ROM-RAM 106 is added to the data received by the DMA transfer to the terminal of the communication partner through the communication link 108. In Step S622, the communication module 105 waits for completion of the transmission of the packet. After the transmission of the packet is completed, the flow proceeds to Step S609. In Step S609, the communication module 105 indicates the completion of the RTP frame transmission to the communication control CPU 104, and then the process terminates.

If the retransmission in the MAC level does not succeed even after the retransmission in Step S618 has been tried a predetermined number of times, the communication module 105 indicates to the communication control CPU 104 that any error in the MAC level occurs in the indication of the completion of the RTP frame transmission in Step S609. In other words, the communication module 105 expects retransmission on the upper layer.

As described above, according to the present embodiment, since the transmission is performed in the Block Ack scheme while the data encoded by the multi-encoder 103 is divided into packets that are transmitted as the RTP frame, it is not necessary to receive the Ack each time the packet is transmitted, thus improving the transfer efficiency.

Figure 7:
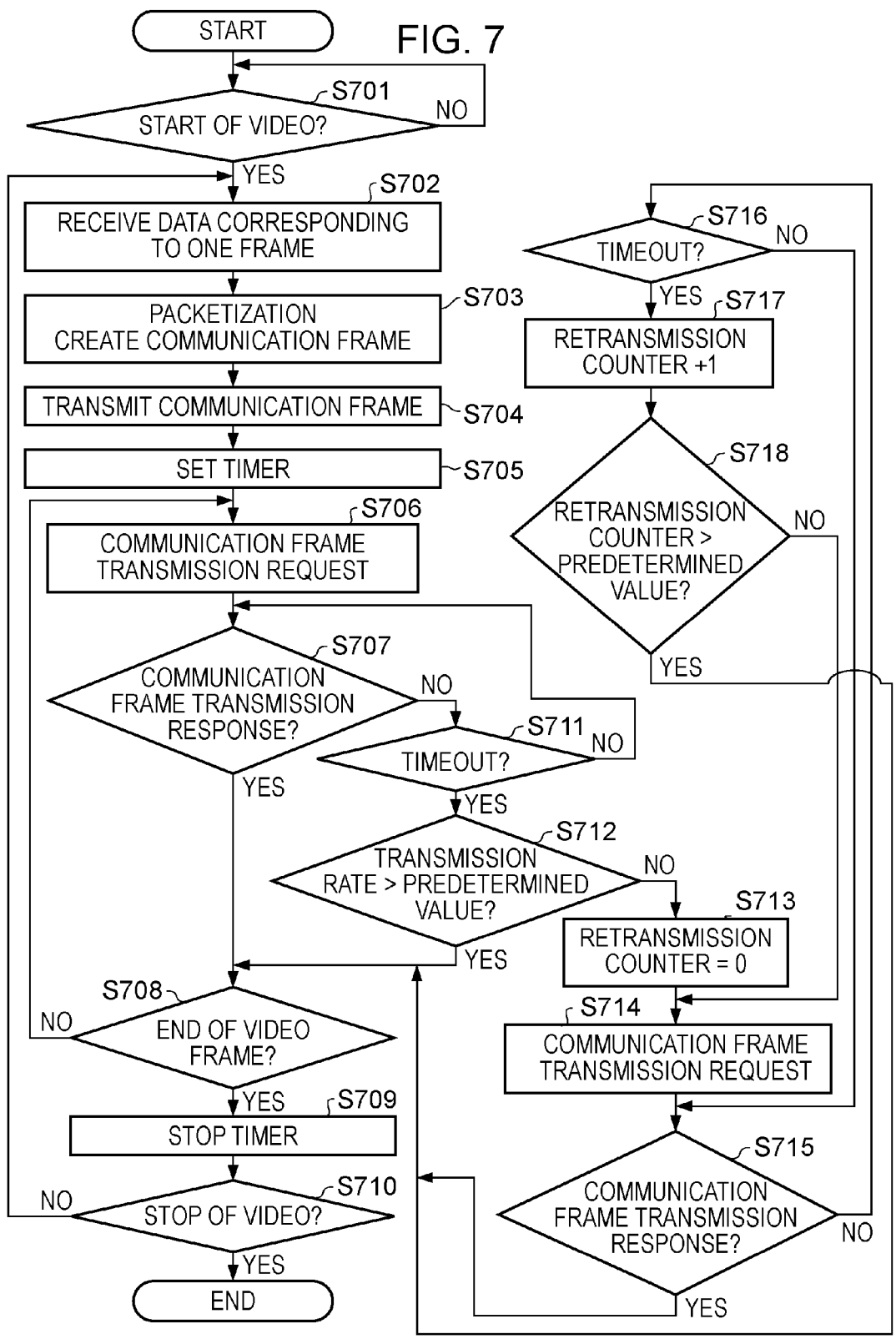
FIG. 7 is a flowchart illustrating an example of a stream transmission process performed by the communication control CPU according to a third embodiment of the present invention.

FIG. 7 is a flowchart illustrating an example of a stream transmission process performed by the communication control CPU 104 according to a third embodiment of the present invention.

In Step S701, the communication control CPU 104 waits for start of a video supplied from the multi-encoder 103. After the video is started and the communication control CPU 104 detects that the streaming from the multi-encoder 103 is enabled, the flow proceeds to Step S702, where the communication control CPU 104 receives video data corresponding to one frame from the multi-encoder 103 and stores the received video data in the ROM/RAM 106.

In Step S703, the communication control CPU 104 divides (packetizes) the video data in accordance with the size of each communication frame, such as an Internet protocol (IP) frame. In Step S704, the communication control CPU 104 transmits the communication frame to the communication module 105 by the DMA transfer. In Step S705, the communication control CPU 104 sets a timer in which a timeout time of transmission of one communication frame is set. For example, if 30 video frames are to be transmitted per second, it is necessary to transmit one frame within 1/30 seconds=about 0.033 seconds. Since one video frame is divided into communication frames in accordance with the settings of the communication protocol, the timeout time of the transmission of one communication frame is set in the timer.

In Step S706, the communication control CPU 104 transmits a communication frame transmission request to the communication module 105. In Step S707, the communication control CPU 104 waits for a communication frame transmission response from the communication module 105. After the communication frame transmission response is received, in Step S708, the communication control CPU 104 determines whether all the communication frames generated by packetizing the video frame have been transmitted.

If the communication control CPU 104 determines that all the communication frames have been transmitted, then in Step S709, the communication control CPU 104 stops the timer for the transmission of the video frame. If the communication control CPU 104 determines in Step S708 that all the communication frames have not been transmitted, the flow returns to Step S706, where the next communication frame is transmitted.

In Step S710, the communication control CPU 104 determines whether the video is stopped. If the communication control CPU 104 determines that the video is stopped, the stream transmission process illustrated in FIG. 7 is terminated. If the communication control CPU 104 determines that the video is not stopped, the flow returns to Step S702, where the next video frame is processed.

If the communication control CPU 104 determines in Step S707 that the communication frame transmission response is not received, then in Step S711, the communication control CPU 104 determines whether the timeout of the communication frame occurs. If the communication control CPU 104 determines that the timeout of the communication frame does not occur, the flow returns to Step S707, where the communication control CPU 104 waits for the communication frame transmission response.

If the communication control CPU 104 determines in Step S711 that the timeout of the communication frame occurs, then in Step S712, the communication control CPU 104 determines whether the transmission rate is higher than a predetermined value. The transmission rate indicates the number of video frames transmitted per second. Accordingly, the higher the transmission rate, the shorter the time during which one frame must be transmitted. In other words, if the retransmission is performed when 30 video frames in, for example, motion picture data are to be transmitted per second, it takes a time to perform the retransmission and, therefore, it is difficult to keep the transmission rate. Consequently, the retransmission is not performed at such a transmission rate. The communication control CPU 104 performs this determination in Step S712.

If the communication control CPU 104 determines in Step S712 that the transmission rate is higher than the predetermined value, the communication control CPU 104 does not perform the retransmission and the flow proceeds to Step S708, where the next communication frame is processed. If the communication control CPU 104 determines in Step S712 that the transmission rate is not higher than the predetermined value, the communication control CPU 104 performs the retransmission. In Step S713, the communication control CPU 104 resets the retransmission counter to zero and starts the timer for retransmission.

In Step S714, the communication control CPU 104 transmits a communication frame transmission request to the communication module 105 to instruct the communication module 105 to retransmit the communication frame. In Step S715, the communication control CPU 104 waits for a communication frame transmission response from the communication module 105. After the communication frame transmission response is received, the flow returns to Step S708. If the communication control CPU 104 does not receive the communication frame transmission response in Step S715, then in Step S716, the communication control CPU 104 determines whether timeout of the retransmission occurs. If the communication control CPU 104 determines that the timeout of the retransmission does not occur, the flow returns to Step S715, where the communication control CPU 104 waits for the communication frame transmission response.

If the communication control CPU 104 determines that the timeout of the retransmission occurs, then in Step S717, the communication control CPU 104 increments the retransmission counter by one. In Step S718, the communication control CPU 104 determines whether the number of retransmission times exceeds a predetermined value. If the communication control CPU 104 determines that the number of retransmission times exceeds the predetermined value, the flow returns to Step S708, where the next communication frame is processed. If the communication control CPU 104 determines that the number of retransmission times does not exceed the predetermined value, the flow returns to Step S714, where the communication frame transmission request for the retransmission is transmitted to the communication module 105.

Figure 8:
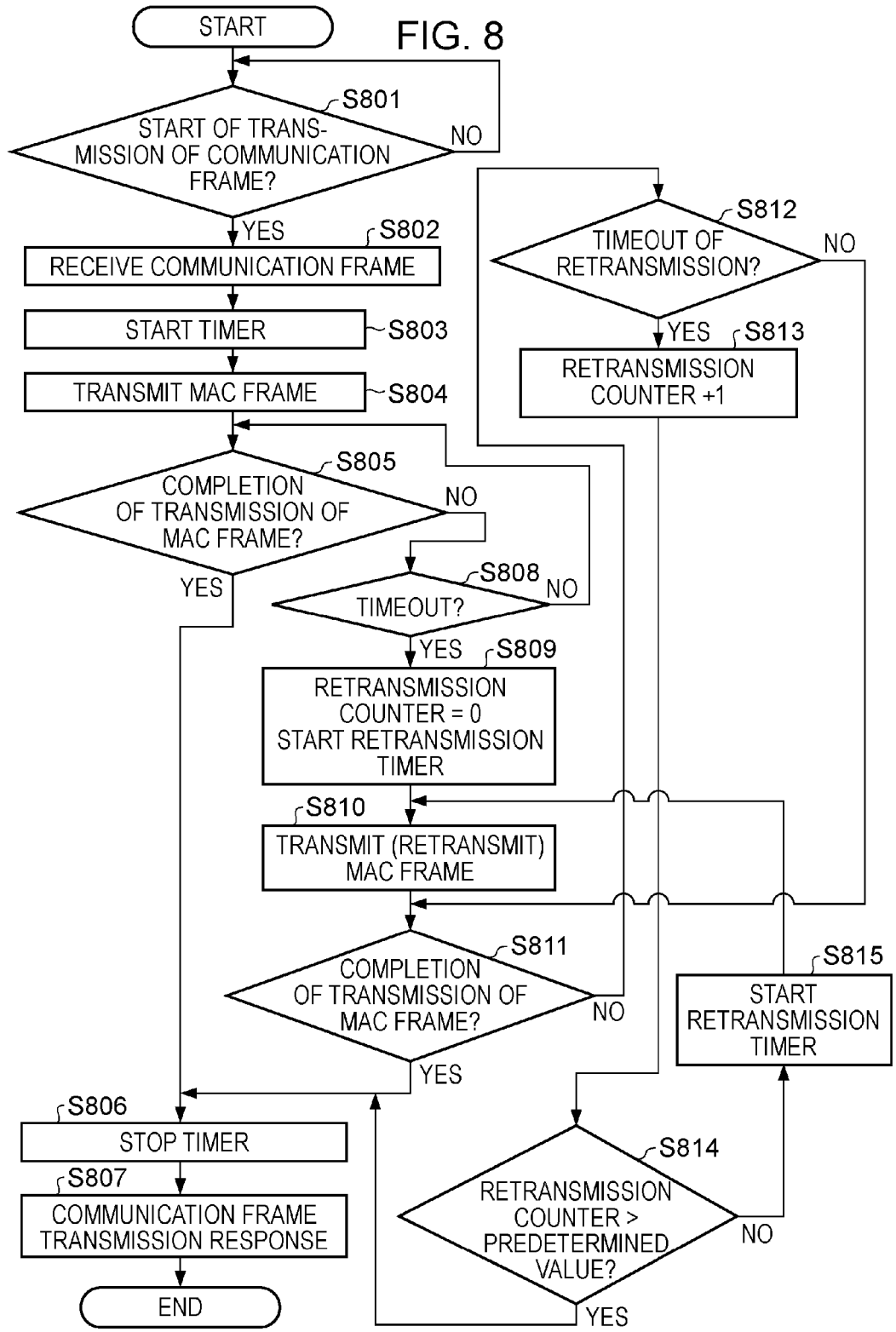
FIG. 8 is a flowchart illustrating an example of a communication frame transmission process performed by the communication module according to the third embodiment of the present invention.

FIG. 8 is a flowchart illustrating an example of a communication frame transmission process performed by the communication module 105 according to the present embodiment.

In Step S801, the communication module 105 waits for start of transmission of a communication frame to the communication module 105 by the communication control CPU 104. After the transmission of the communication frame is started, in Step S802, the communication module 105 receives the communication frame. In Step S803, the communication module 105 starts a timer for the transmission of the communication frame. In Step S804, the communication module 105 transmits a MAC frame in which a MAC header for wireless LAN is added to the received communication frame.

In Step S805, the communication module 105 waits for completion of the transmission of the MAC frame. After the transmission of the MAC frame is completed, in Step S806, the communication module 105 stops the timer. In Step S807, the communication module 105 returns a communication frame transmission response to the communication control CPU 104, and then the process terminates.

If the transmission of the MAC frame is not completed in Step S805, then in Step S808, the communication module 105 determines whether timeout occurs. If the communication module 105 determines that the timeout does not occur, the flow returns to Step S805, where the communication module 105 waits for the completion of the transmission of the MAC frame. If the communication module 105 determines that the timeout occurs, then in Step S809, the communication module 105 sets a retransmission counter to zero and starts the retransmission timer. In Step S810, the communication module 105 retransmits the MAC frame. In Step S811, the communication module 105 determines whether the transmission of the MAC frame is completed.

If the communication module 105 determines that the transmission of the MAC frame is completed, the flow returns to Step S806, where the timer is stopped. If the communication module 105 determines that the transmission of the MAC frame is not completed, then in Step S812, the communication module 105 determines whether timeout of the retransmission occurs. If the communication module 105 determines that the timeout of the retransmission does not occur, the flow returns to Step S811, where the communication module 105 waits for the completion of the transmission of the MAC frame.

If the communication module 105 determines that the timeout of the retransmission occurs, then in Step S813, the communication module 105 increments the retransmission counter by one. In Step S814, the communication module 105 determines whether the retransmission counter exceeds a predetermined value. If the communication module 105 determines that the retransmission counter exceeds the predetermined value, the communication module 105 terminates the retransmission and the flow returns to Step S806, where the timer is stopped. If the communication module 105 determines that the retransmission counter does not exceed the predetermined value, then in Step S815, the communication module 105 starts the retransmission timer and the flow returns to Step S810, where the MAC frame is re-transmitted.

The transmission through a wireless LAN normally has a higher probability with which any communication error occurs, that is, a higher error rate than that of the transmission through a wired LAN, and has a higher probability of error in the retransmission. At a higher transmission rate, there are cases in which the packets do not reach the receiver device within a time permitted by the receiver device due to any delay in the retransmission and the retransmission goes to waste. The present embodiment is characterized by moving to the next process without performing the retransmission if the transmission rate is high and the processing time permitted by the receiver device is short. Accordingly, it is possible to reduce the number of times of the retransmission to reduce any delay. In addition, it is possible to reduce the load on the receiver device to achieve the efficient transmission.

Figure 9:
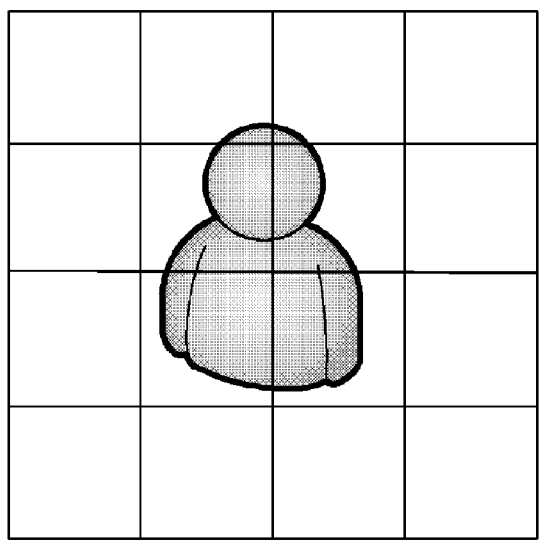
FIG. 9 is a diagram describing macro blocks.
Figure 10:
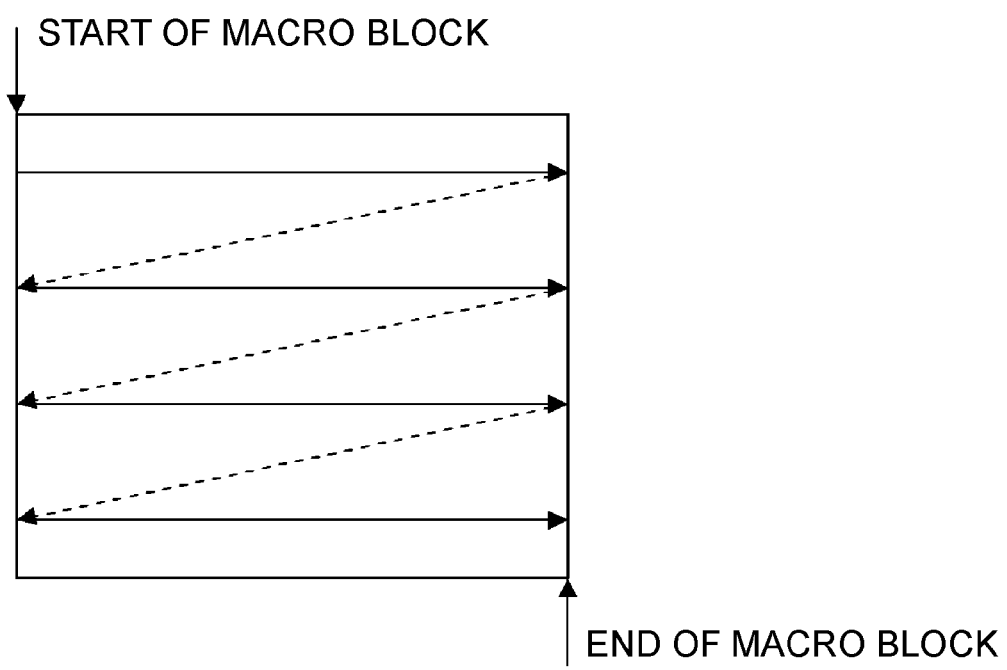
FIG. 10 is a diagram describing macro blocks.

FIGS. 9 and 10 illustrate macro blocks. Various encoding algorithms are used for compressing videos. In encoding algorithms including MPEG4, each video is divided into rectangular blocks corresponding to 16×16 pixels to perform the encoding. Such a block is referred to as a macro block. For example, in the case of a video image of a person illustrated in FIG. 9, the video image is divided into 16×16 macro blocks to perform the encoding.

In normal transmission of video data, the video data is transmitted in units of lines from left to right. However, according to a fourth embodiment of the present invention, the video data is transmitted in units of macro blocks instead of units of lines. Specifically, as illustrated in FIG. 10, data in the area of a macro block is transmitted from left to right.

Figure 11A:
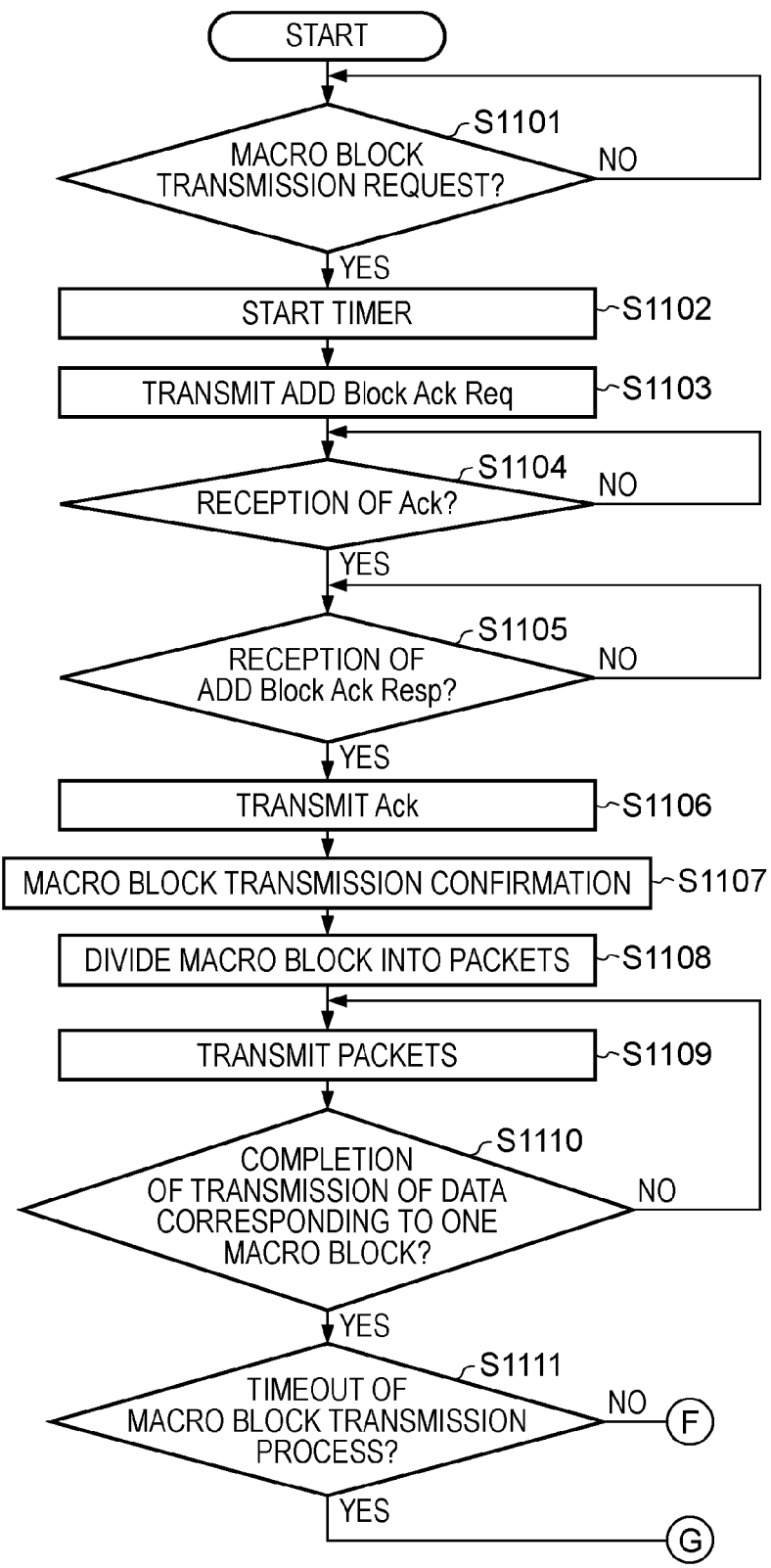
FIGS. 11A and 11B are flowcharts illustrating an example of a macro block transmission process performed by the communication module according to a fourth embodiment of the present invention.
Figure 11B:
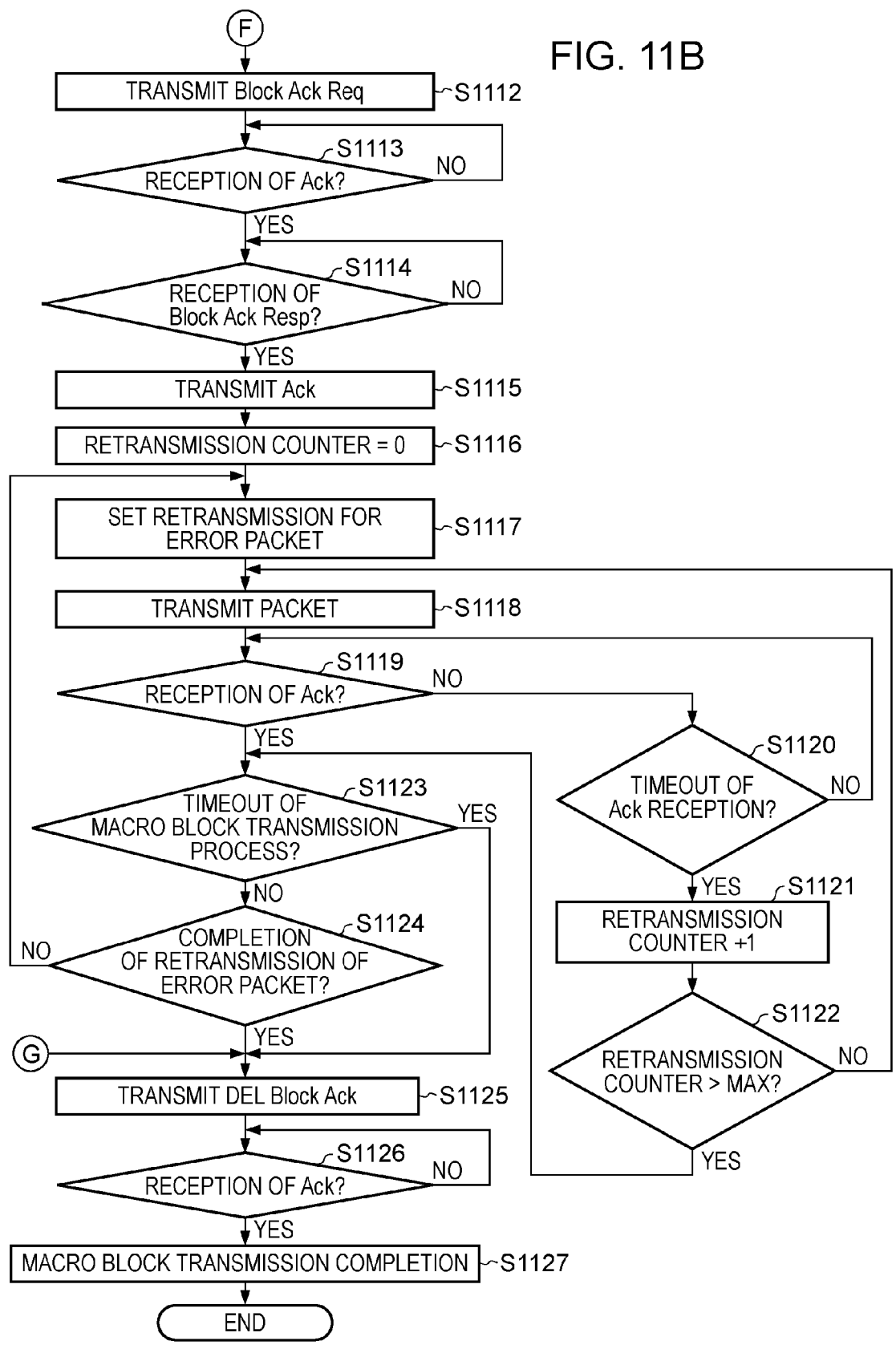

FIGS. 11A and 11B are flowcharts illustrating an example of a macro block transmission process performed by the communication module 105 according to the present embodiment.

In Step S1101, the communication module 105 waits for a macro block transmission request from the communication control CPU 104. After the macro block transmission request is received, in Step S1102, the communication module 105 starts a timer in which a timeout time of transmission of one macro block is set.

In Step S1103, the communication module 105 transmits an ADD Block Ack Req to the terminal of the communication partner through the communication link 108 in order to start the Block Ack scheme. In Step S1104, the communication module 105 waits for reception of an Ack indicating that the packet corresponding to the ADD Block Ack Req has been received by the terminal of the communication partner.

After the Ack is received, in Step S1105, the communication module 105 waits for the terminal of the communication partner to recognize the ADD Block Ack Req and for reception of an ADD Block Ack Resp indicating that the Block Ack scheme is acknowledged by the terminal of the communication partner. After the ADD Block Ack Resp is received through the communication link 108, in Step S1106, the communication module 105 transmits an Ack indicating that the packet corresponding to the ADD Block Ack Resp has been received.

In Step S1107, the communication module 105 transmits a macro block transmission confirmation indicating that it is ready for the macro block transmission process in the Block Ack scheme to the communication control CPU 104.

At this time, the video data corresponding to one macro block is stored in the RAM in the ROM/RAM 106 by the communication control CPU 104. In Step S1108, the communication module 105 divides the macro block stored in the RAM in the ROM/RAM 106 into packets each having a length corresponding to the communication protocol. In Step S1109, the communication module 105 transmits the packets of the video data through the communication link 108. In normal communication, after transmitting the packets, the communication module 105 waits for reception of an Ack from the terminal of the communication partner.

However, since the Block Ack scheme is set in the macro block transmission process according to the present embodiment, the communication module 105 does not wait for reception of an Ack and the flow proceeds to Step S1110. In Step S1110, the communication module 105 determines whether the data corresponding to one macro block in the ROM/RAM 106 has been transmitted. If the communication module 105 determines that the data corresponding to one macro block in the ROM/RAM 106 has not been transmitted, the flow returns to Step S1109, where the next packet is transmitted. If the communication module 105 determines that the data corresponding to one macro block in the ROM-RAM 106 has been transmitted, then in Step S1111, the communication module 105 determines whether timeout of the macro block transmission process occurs.

If the communication module 105 determines that the timeout of the macro block transmission process occurs, then in Step S1125, the communication module 105 transmits a DEL Block Ack for terminating the Block Ack scheme because the data is wasted even if the transmission is performed. In Step S1126, the communication module 105 waits for reception of an Ack. In Step S1127, the communication module 105 transmits a macro block transmission completion indicating that the macro block transmission process is terminated to the communication control CPU 104 to terminate the macro block transmission process and waits for the next macro block transmission request.

If the communication module 105 determines in Step S111 that the timeout of the macro block transmission process does not occur, the flow proceeds to Step S1112 because the transmission of the packet corresponding to one macro block is completed. In Step S1112, the communication module 105 transmits a Block Ack Req to the terminal of the communication partner through the communication link 108. The Block Ack Req is used for requesting integration of the Acks to determine whether the transmitted packets have been normally received. In Step S1113, the communication module 105 waits for reception of an Ack indicating that the Block Ack Req is normally received.

In Step S1114, the communication module 105 waits for reception of a Block Ack Resp collectively indicating the pieces of Ack information transmitted from the terminal of the communication partner. After the Block Ack Resp is received, in Step S1115, the communication module 105 transmits an Ack indicating that the Block Ack Resp has been received to the terminal of the communication partner. In Step S1116, the communication module 105 initializes a retransmission counter to zero in order to prepare the retransmission.

In Step S1117, the communication module 105 checks the Ack information in the Block Ack Resp and sets the retransmission for the first error packet. In Step S1118, the communication module 105 transmits the packet for which the retransmission is set. In Step S1119, the communication module 105 waits for reception of an Ack indicating that the packet for which the retransmission is set has been received.

If the communication module 105 does not receive the Ack, then in Step S1120, the communication module 105 determines whether timeout of the Ack reception occurs. If the communication module 105 determines that the timeout of the Ack reception occurs, then in Step S1121, the communication module 105 increments the retransmission counter by one. In Step S1122, the communication module 105 determines whether the retransmission counter exceed a predetermined number of times of the retransmission.

If the communication module 105 determines in Step S1120 that the timeout of the Ack reception does not occur, the flow returns to Step S1119, where the communication module 105 waits for reception of the Ack. If the communication module 105 determines in Step S1122 that the retransmission counter does not exceed MAX (the predetermined number of times of the retransmission), the flow returns to Step S1118, where the error packet is re-transmitted. If the communication module 105 determines in Step S1122 that the retransmission counter exceeds the MAX (the predetermined number of times of the retransmission), the flow proceeds to Step S1123.

If the communication module 105 receives the Ack in Step S1119, the flow proceeds to Step S1123. In Step S1123, the communication module 105 determines whether timeout of the macro block transmission process occurs due to the retransmission. If the communication module 105 determines that the timeout of the macro block transmission process occurs, then in Step S1125, the communication module 105 transmits a DEL Block Ack for terminating the Block Ack scheme. In Step S1126, the communication module 105 waits for reception of an Ack. In Step S1127, the communication module 105 transmits the macro block transmission completion to the communication control CPU 104 to move to the transmission of the next macro block.

If the communication module 105 determines in Step S1123 that the timeout of the macro block transmission process does not occur, then in Step S1124, the communication module 105 determines whether the retransmission of all the error packets indicated in the Block Ack Resp has been completed. If the communication module 105 determines that the retransmission of all the error packets indicated in the Block Ack Resp has been completed, then in Step S1125, the communication module 105 transmits a DEL Block Ack for terminating the Block Ack scheme. In Step S1126, the communication module 105 waits for reception of an Ack. In Step S1127, the communication module 105 transmits the macro block transmission completion indicating that the macro block transmission process is terminated to the communication control CPU 104 to move to the transmission of the next macro block.

If the communication module 105 determines in Step S1124 that the retransmission of all the error packets indicated in the Block Ack Resp has not been completed, the flow returns to Step S1117, where the next error packet is transmitted.

Normally, when 30 video frames are to be transmitted per second, the time permitted to the transmission and display of one frame is 1/30 seconds. If it takes a longer time than 1/30 seconds to transmit and display one frame, it is necessary to move to the processing of the next frame. According to the present embodiment, the number of retransmission times in units of macro blocks can be reduced to complete the processing of one frame within a predetermined time. Accordingly, it is possible to realize efficient frame processing. As a result, the macro block transmission process according to the present embodiment has the advantage in that any failure, such as drop frame or stop of display, is not visible to a user.

Figure 12:
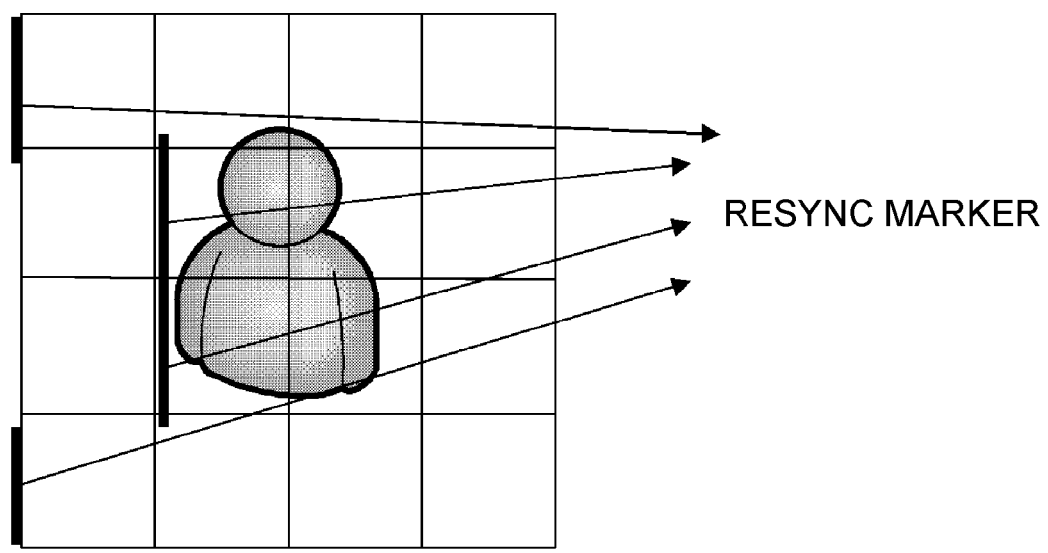
FIG. 12 illustrates resync markers.

FIG. 12 illustrates resynchronization markers (hereinafter referred to as "resync markers"). Since the receiver device cannot decompress compressed video data normally if any error occurs in communication of the compressed video data, the transmitter device puts the resync markers in the video stream against the error. For example, if any error occurs, the transmitter device goes back to the previous resync marker to retransmit the data or skips to the next resync marker.

Figure 13A:
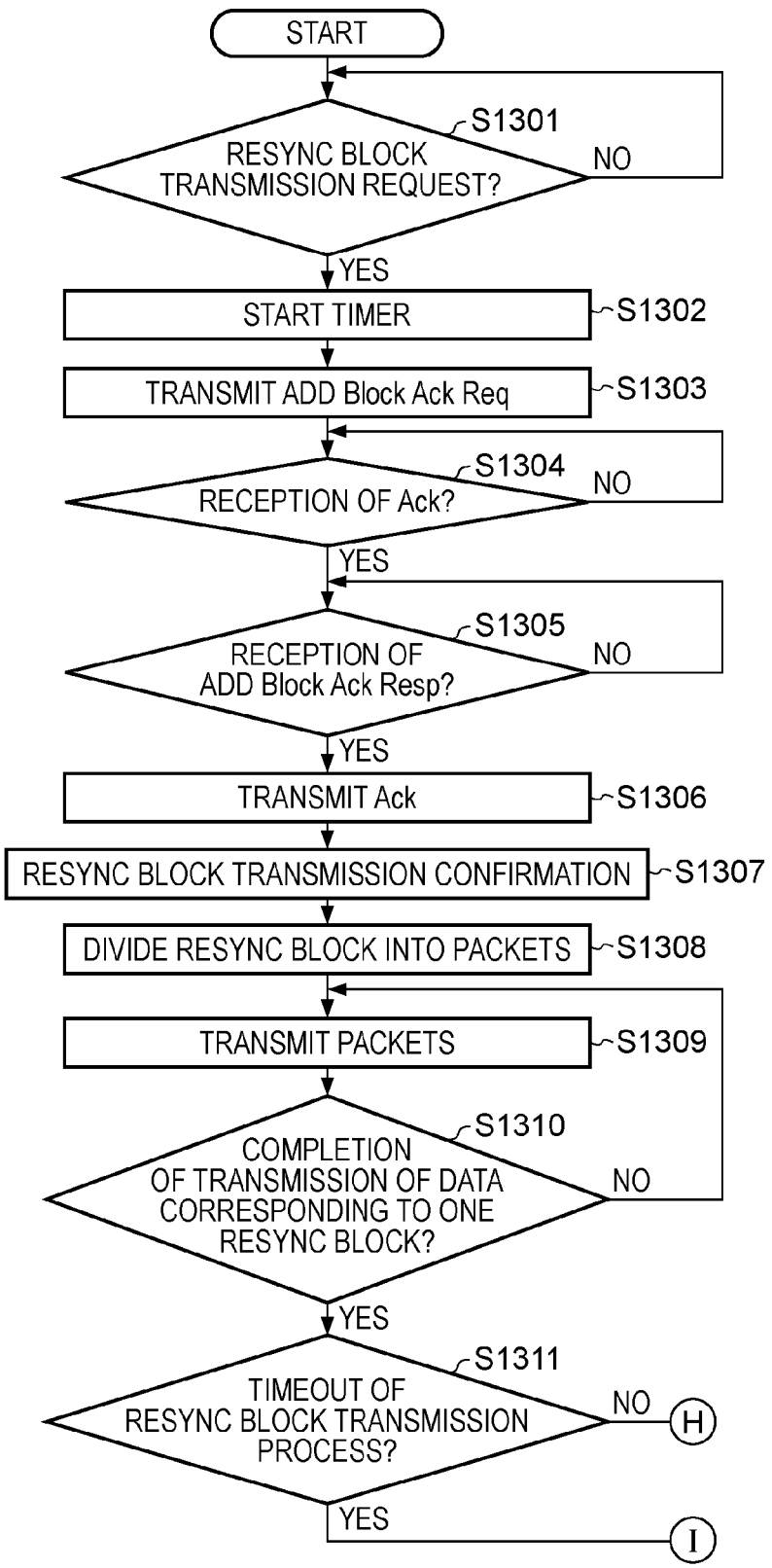
FIGS. 13A and 13B are flowcharts illustrating an example of a resync block transmission process performed by the communication module according to a fifth embodiment of the present invention.
Figure 13B:
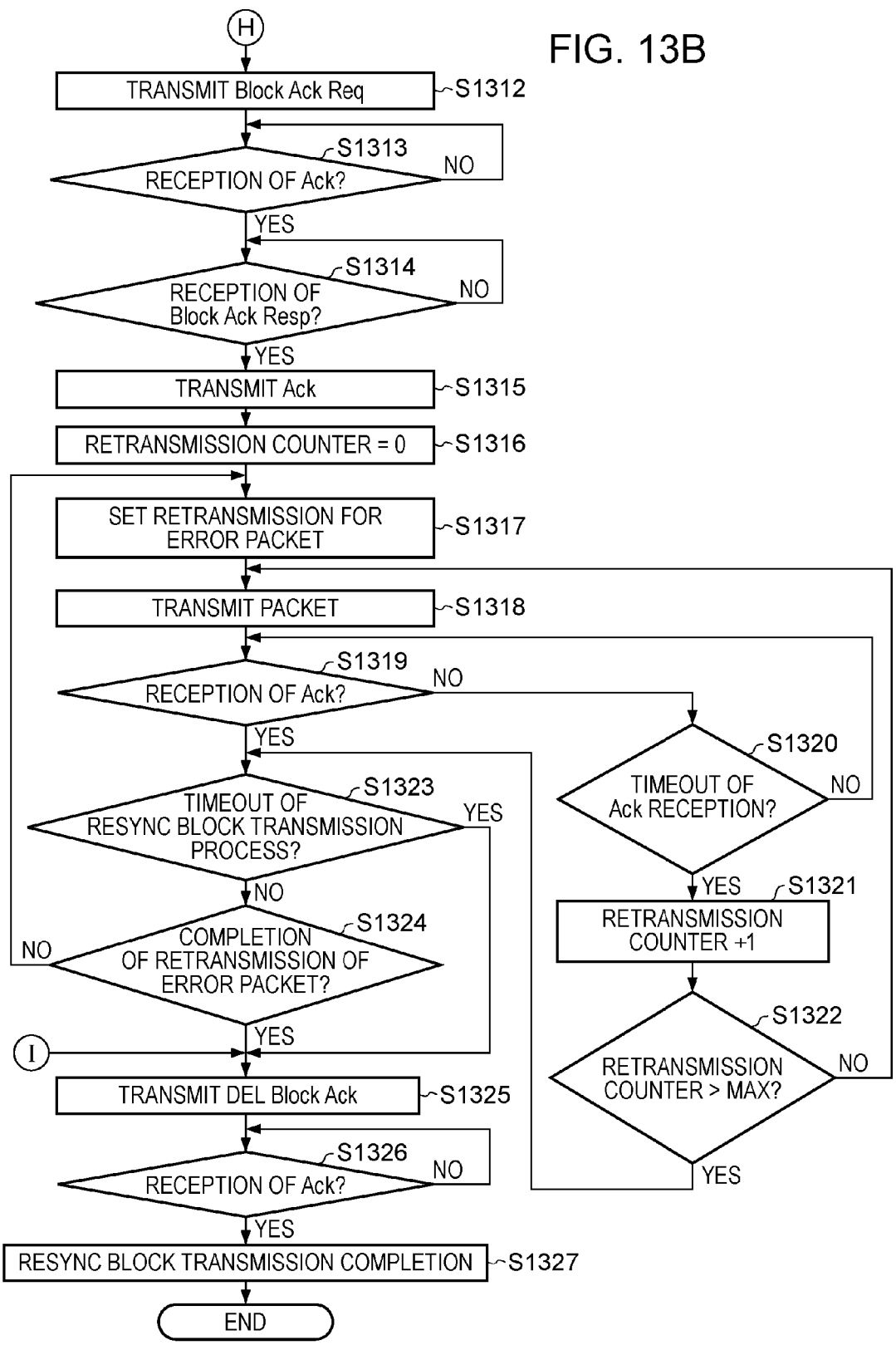

FIGS. 13A and 13B are flowcharts illustrating an example of a resync block transmission process performed by the communication module 105 according to a fifth embodiment of the present invention.

In Step S1301, the communication module 105 waits for a resync block transmission request from the communication control CPU 104. After the resync block transmission request is received, in Step S1302, the communication module 105 starts a timer in which a timeout time of transmission of one resync block is set.

In Step S1303, the communication module 105 transmits an ADD Block Ack Req to the terminal of the communication partner through the communication link 108 in order to start the Block Ack scheme. In Step S1304, the communication module 105 waits for reception of an Ack indicating that the packet corresponding to the ADD Block Ack Req has been received by the terminal of the communication partner.

After the Ack is received, in Step S1305, the communication module 105 waits for the terminal of the communication partner to recognize the ADD Block Ack Req and for reception of an ADD Block Ack Resp indicating that the Block Ack scheme is acknowledged by the terminal of the communication partner. After the ADD Block Ack Resp is received through the communication link 108, in Step S1306, the communication module 105 transmits an Ack indicating that the packet corresponding to the ADD Block Ack Resp has been received.

In Step S1307, the communication module 105 transmits a resync block transmission confirmation indicating that it is ready for the resync block transmission process in the Block Ack scheme to the communication control CPU 104.

At this time, the video data corresponding to one resync block is stored in the RAM in the ROM/RAM 106 by the communication control CPU 104. In Step S1308, the communication module 105 divides the resync block stored in the RAM in the ROM/RAM 106 into packets each having a length corresponding to the communication protocol. In Step S1309, the communication module 105 transmits the packets of the video data through the communication link 108. In normal communication, after transmitting the packets, the communication module 105 waits for reception of an Ack from the terminal of the communication partner.

However, since the Block Ack scheme is set in the resync block transmission process according to the present embodiment, the communication module 105 does not wait for reception of an Ack, and the flow proceeds to Step S1310.

In Step S1310, the communication module 105 determines whether the data corresponding to one resync block in the ROM/RAM 106 has been transmitted. If the communication module 105 determines that the data corresponding to one resync block in the ROM/RAM 106 has not been transmitted, the flow returns to Step S1309, where the next packet is transmitted. If the communication module 105 determines that the data corresponding to one resync block in the ROM/RAM 106 has been transmitted, then in Step S1311, the communication module 105 determines whether timeout of the resync block transmission process occurs.

If the communication module 105 determines that the timeout of the resync block transmission process occurs, then in Step S1325, the communication module 105 transmits a DEL Block Ack for terminating the Block Ack scheme because the data is wasted even if the transmission is performed. In Step S1326, the communication module 105 waits for reception of an Ack. In Step S1327, the communication module 105 transmits a resync block transmission completion indicating that the resync block transmission process is terminated to the communication control CPU 104 to terminate the resync block transmission process and waits for the next resync block transmission request.

If the communication module 105 determines in Step S1311 that the timeout of the resync block transmission process does not occur, the flow proceeds to Step S1312 because the transmission of the packet corresponding to one resync block is completed. In Step S1312, the communication module 105 transmits a Block Ack Req to the terminal of the communication partner through the communication link 108. The Block Ack Req is used for requesting integration of the Acks to determine whether the transmitted packets have been normally received. In Step S1313, the communication module 105 waits for reception of an Ack indicating that the Block Ack Req is normally received. In Step S1314, the communication module 105 waits for reception of a Block Ack Resp collectively indicating the pieces of Ack information transmitted from the terminal of the communication partner. After the Block Ack Resp is received, then in Step S1315, the communication module 105 transmits an Ack indicating that the Block Ack Resp has been received to the terminal of the communication partner.

In Step S1316, the communication module 105 initializes a retransmission counter to zero in order to prepare the retransmission. In Step S1317, the communication module 105 checks the Ack information in the Block Ack Resp and sets the retransmission for the first error packet. In Step S1318, the communication module 105 transmits the packet for which the retransmission is set. In Step S1319, the communication module 105 waits for reception of an Ack indicating that the packet for which the retransmission is set has been received.

If the communication module 105 does not receive the Ack, then in Step S1320, the communication module 105 determines whether timeout of the Ack reception occurs. If the communication module 105 determines that the timeout of the Ack reception occurs, then in Step S1321, the communication module 105 increments the retransmission counter by one. In Step S1322, the communication module 105 determines whether the retransmission counter exceed a predetermined number of times of the retransmission.

If the communication module 105 determines in Step S1320 that the timeout of the Ack reception does not occur, the flow returns to Step S1319, where the communication module 105 waits for reception of the Ack. If the communication module 105 determines in Step S1322 that the retransmission counter does not exceed MAX (the predetermined number of times of the retransmission), the flow returns to Step S1318, where the error packet is re-transmitted. If the communication module 105 determines in Step S1322 that the retransmission counter exceeds the MAX (the predetermined number of times of the retransmission), the flow proceeds to Step S1323.

If the communication module 105 receives the Ack in Step S1319, the flow proceeds to Step S1323. In Step S1323, the communication module 105 determines whether timeout of the resync block transmission process occurs due to the retransmission. If the communication module 105 determines that the timeout of the resync block transmission process occurs, then in Step S1325, the communication module 105 transmits a DEL Block Ack for terminating the Block Ack scheme. In Step S1326, the communication module 105 waits for reception of an Ack. In Step S1327, the communication module 105 transmits the resync block transmission completion to the communication control CPU 104 to move to the transmission of the next resync block.

If the communication module 105 determines in Step S1323 that the timeout of the resync block transmission process does not occur, then in Step S1324, the communication module 105 determines whether the retransmission of all the error packets indicated in the Block Ack Resp has been completed. If the communication module 105 determines that the retransmission of all the error packets indicated in the Block Ack Resp has been completed, then in Step S1325, the communication module 105 transmits a DEL Block Ack for terminating the Block Ack scheme. In Step S1326, the communication module 105 waits for reception of an Ack. In Step S1327, the communication module 105 transmits the resync block transmission completion indicating that the resync block transmission process is terminated to the communication control CPU 104 to move to the transmission of the next resync block.

If the communication module 105 determines in Step S1324 that the retransmission of all the error packets indicated in the Block Ack Resp has not been completed, the flow returns to Step S1317, where the next error packet is transmitted.

FIG. 14 is a flowchart illustrating an example of a stream transmission process performed by the communication control CPU 104 according to the present embodiment.

In Step S1401, the communication control CPU 104 instructs the multi-encoder 103 to start an encoding process of a stream. In Step S1402, the communication control CPU 104 waits for start of a video supplied from the multi-encoder 103. After the video supplied from the multi-encoder 103 is started, in Step S1403, the communication control CPU 104 receives the encoded video data and stores the received video data in the RAM in the ROM/RAM 106.

In Step S1404, the communication control CPU 104 divides the video data to create a resync block to which a resync marker is added and stores the created resync block in the RAM in the ROM/RAM 106. In Step S1405, the communication control CPU 104 transmits a resync block transmission request to the communication module 105. The communication module 105 reads out the resync block from the RAM in the ROM/RAM 106 in response to the resync block transmission request and transmits the resync block.

In Step S1406, the communication control CPU 104 waits for reception of a resync block transmission confirmation indicating that the transmission request has been received from the communication module 105. After the resync block transmission confirmation is received, in Step S1407, the communication control CPU 104 waits for reception of a resync block transmission completion indicating that the actual resync block transmission is terminated. After the resync block transmission completion is received, in Step S1408, the communication control CPU 104 determines whether the transmission of the resync block is normally terminated.

If the communication control CPU 104 determines that the transmission of the resync block is normally terminated, then in Step S1409, the communication control CPU 104 determines whether the video supplied from the multi-encoder 103 is stopped. If the communication control CPU 104 determines that the video is stopped, the process terminates. If the communication control CPU 104 determines that the video is not stopped, the flow returns to Step S1403, where transmission of the next resync block occurs. If the communication control CPU 104 determines in Step S1408 that any error occurs in the transmission of the resync block, then in Step S1410, the communication control CPU 104 retransmits the resync block, and the flow proceeds to Step S1409.

According to the present embodiment, adopting the Block Ack scheme to the transmission of each resync block allows the number of Acks used in the transmission of the resync block to be minimized to achieve the efficient stream transmission. In addition, the transmission and the retransmission in units of resync blocks allows the delay at the receiver device to be reduced while the minimal retransmission is performed to realize the communication in real time.

According to the above-described embodiments, the retransmission can be efficiently controlled, for example, if any error occurs. Consequently, it is possible to improve the efficiency of the retransmission.

The present invention can be embodied by supplying a recording medium (or a storage medium) having the program code of software realizing the functions according to the above embodiments to a system or an apparatus, the computer (or the CPU or the micro processing unit (MPU)) in which system or apparatus reads out and executes the program code stored in the recording medium. In this case, the program code itself read out from the recording medium realizes the functions of the embodiments described above. The present invention is applicable to the recording medium having the program code recorded therein.

The computer that executes the readout program code realizes the functions of the embodiments described above. In addition, the operating system (OS) or the like running on the computer may execute all or part of the actual processing based on instructions in the program code to realize the functions of the embodiments described above.

Alternatively, after the program code read out from the recording medium has been written in a memory that is provided in an expansion board included in the computer or in an expansion unit connected to the computer, the CPU or the like in the expansion board or the expansion unit may execute all or part of the actual processing based on instructions in the program code to realize the functions of the embodiments described above.

When the present invention is applied to the recording medium, the program code corresponding to the flowcharts described above is stored in the recording medium.

According to the above-described embodiments, it is possible to improve the efficiency of the retransmission.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and functions.

This application claims the benefit of Japanese Application No. 2006-257889 filed Sep. 22, 2006, which is hereby incorporated by reference herein in its entirety.

What is claimed is:

1. A communication apparatus comprising:
a communication device configured to perform communication access control;
a detection device configured to detect a start and end of a frame of a video to be transmitted;
a notifying device configured to notify a transmission request of the frame to the communication device, and
a timer configured to determine timeout time of transmission of one frame of the video;
wherein the communication device notifies a start of a Block Ack scheme in a media access control level to a receiving device in response to the transmission request notified by the notifying device, and divides the one frame of the video into packets each having a length corresponding to the communication protocol and transmits the divided packets to receiving device, and
wherein, if the transmission of all the divided packets of the one frame is completed without a retransmission before the timer times out, the communication device requests the receiving device for ACK transmission of the Block Ack scheme and, if the transmission of all the divided packets of the one frame is not completed without a retransmission before the timer times out, the communication device does not request the receiving device for ACK transmission of the Block Ack scheme
wherein the notifying device describes the information indicating that the start or end of the frame of the video is detected in a Real-time Transport protocol header.

2. A communication apparatus comprising:
a communication device configured to perform communication access control; and
a notifying device configured to notify a transmission request to the communication device for each micro block of a video to be transmitted; and
a timer configured to determine timeout time of transmission of one macro block of the video;
wherein the communication device notifies a start of a Block Ack scheme in a media access control level to a receiving device in response to the transmission request notified by the notifying device, and the communication device divides the one macro block of the video into packets each having a length corresponding to the communication protocol and transmits the divided packets to the receiving device, and
wherein, if the transmission of all the divided packets of the one macro block is completed without a retransmission before the timer times out, the communication device requests the receiving device for ACK transmission of the Block Ack scheme and, if the transmission of all the divided packets of the one macro block is not completed without retransmission before the timer times out, the communication device does not request the receiving device for ACK transmission.

3. A communication apparatus comprising:
a communication device configured to perform communication access control; and
a notifying device configured to notify a transmission request to the communication device for each resynchronization block of a video to be transmitted; and
a timer configured to determine timeout time of transmission of one resynchronization block of the video,
wherein the communication device notifies a start of a Block Ack Scheme in a media access control level to a receiving device in response to the transmission request notified by the notifying device, and the communication device divides the one resynchronization block of video into packets each having a length corresponding to the communication protocol and transmits the divided packets to the receiving device, and
wherein, if the transmission of all the divided packets of the one resynchronization block is completed without a retransmission before the timer times out, the communication device requests the receiving device for ACK transmission of the Block Ack scheme and, if the transmission of all the divided packets of the one resynchronization block is not completed without a retransmission before the timer times out, the communication device does not request the receiving device for ACK transmission.

4. A method of transferring data in a communication apparatus including a communication unit that performs communication access control, the method comprising:
detecting, using a processor, a start and end of a frame of a video;
notifying a transmission request of the frame from the processor to the communication unit, and
determining timeout time of transmission of one frame of the video; wherein the communication unit notifies a start of a Block Ack scheme in a media access level to a receiving device in response to the transmission request, and divides the one frame of the video into packets each having a length corresponding to the communication protocol and transmits the divided packets to the receiving device, and
wherein, if the transmission of all the divided packets of the one frame is completed without a retransmission before the transmission of the one frame of video times out, the communication unit requests the receiving device for ACK transmission of the Block Ack scheme and, if the transmission of all the divided packets of the one frame is not completed without a retransmission before the transmission of the one frame of video times out, the communication device does not request the receiving device for ACK transmission of the Block Ack scheme, wherein the notifying a transmission request describes the information indicating that the start or end of the frame of the video is detected in a Real-time Transport protocol header.

5. A method of transferring data in a communication apparatus including a communication unit that performs communication access control, the method comprising:

detecting, using a processor, a start and end of a macro block of a video;

notifying a transmission request to the communication unit for a macro block to be transmitted; and determining timeout time of transmission of one macro block of the video, wherein the communication unit notifies a start of a Block Ack scheme in a media access control level to a receiving device in response to the transmission request and the communication device divides the one macro block of video into packets each having a length corresponding to the communication protocol and transmits the divided packets to the receiving device, and wherein, if the transmission of all the divided packets of the one macro block is completed without a retransmission before the transmission of the one macro block of video times out, the communication device requests the receiving device for ACK transmission of the Block Ack scheme and, if the transmission of all the divided packets of the one macro block is not completed without a retransmission before the transmission of the one macro block of video times out, the communication device does not request the receiving device for ACK transmission.

6. A method of transferring data in a communication apparatus including a communication unit that performs communication access control, the method comprising:

detecting, using a processor, a position of a resynchronization marker of a video;

notifying a transmission request to the communication unit for each resynchronization block to be transmitted; and determining timeout time of transmission of one resynchronization block of the video, wherein the communication unit notifies a start of a Block Ack scheme in a media access control level to a receiving device in response to the transmission request notified and the communication device divides the one resynchronization block of video into packets each having a length corresponding to the communication protocol and transmits the divided packets to the receiving device, and wherein, if the transmission of all the divided packets of the one resynchronization block is completed without a retransmission before the transmission of the one resynchronization block of video times out, the communication device requests the receiving device for ACK transmission of the Block Ack scheme and, if the transmission of all the divided packets of the one macro block is not completed without a retransmission before the transmission of the one resynchronization block of video times out, the communication device does not request the receiving device for ACK transmission.

* * * * *